United States Patent
Mogi

(10) Patent No.: US 11,221,459 B2
(45) Date of Patent: Jan. 11, 2022

(54) IMAGING OPTICAL SYSTEM AND IMAGING APPARATUS

(71) Applicant: CANON KABUSHIKI KAISHA, Tokyo (JP)

(72) Inventor: Shuichi Mogi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 93 days.

(21) Appl. No.: 16/245,426

(22) Filed: Jan. 11, 2019

(65) Prior Publication Data

US 2019/0219789 A1    Jul. 18, 2019

(30) Foreign Application Priority Data

Jan. 17, 2018    (JP) .............................. JP2018-005382

(51) Int. Cl.
*G02B 7/02* (2021.01)
*H04N 5/225* (2006.01)
*G02B 27/00* (2006.01)
*G02B 5/20* (2006.01)
*G02B 7/04* (2021.01)

(52) U.S. Cl.
CPC ............... *G02B 7/021* (2013.01); *G02B 5/20* (2013.01); *G02B 7/04* (2013.01); *G02B 27/0025* (2013.01); *H04N 5/2254* (2013.01)

(58) Field of Classification Search
CPC .......... G02B 7/02; G02B 7/021; G02B 27/00; G02B 27/0025; G02B 7/04; G02B 5/20; G02B 5/205; G02B 5/22; G02B 5/223; G02B 13/00; G02B 13/06; H04N 5/225; H04N 5/2254

USPC ....... 359/819, 885, 887, 889, 297, 723, 738, 359/739, 893
See application file for complete search history.

(56) References Cited

U.S. PATENT DOCUMENTS 4,906,081 A * 3/1990 Yasuda ................... G02B 5/205
    347/131
5,541,779 A * 7/1996 Choi ....................... G02B 5/205
    359/558
5,552,856 A * 9/1996 Shiraishi ............. G03F 7/70058
    355/53

(Continued)

FOREIGN PATENT DOCUMENTS

JP    S63316802 A    12/1988
JP    H06177006 A    6/1994

(Continued)

OTHER PUBLICATIONS

Office Action issued in Japanese Application No. 2018-005382 dated Nov. 9, 2021. English translation provided.

*Primary Examiner* — Jie Lei
(74) *Attorney, Agent, or Firm* — Rossi, Kimms & McDowell LLP

(57) ABSTRACT

An imaging optical system includes at least one lens, and an optical element having a transmittance that changes in a radial direction perpendicular to an optical axis. The transmittance of the optical element is minimized at a first position in the radial direction separated from an optical axis position of the optical element by a distance smaller than an effective radius rd of the optical element. The transmittance at the first position is smaller than that at the optical axis position and that at a second position separated from the optical axis position by rd.

18 Claims, 15 Drawing Sheets

(56) References Cited

U.S. PATENT DOCUMENTS

2012/0226480 A1* 9/2012 Berkner ............... G02B 5/3025
                                                         703/1
2016/0341973 A1* 11/2016 Ida .......................... G02B 5/22

FOREIGN PATENT DOCUMENTS

| JP | 2014056280 A | 3/2014 |
| --- | --- | --- |
| JP | 2014211617 A | 11/2014 |
| JP | 2014238527 A | 12/2014 |
| JP | 2015079128 A | 4/2015 |
| JP | 2016145862 A | 8/2016 |
| JP | 2017187729 A | 10/2017 |

* cited by examiner

IMAGING OPTICAL SYSTEM AND IMAGING APPARATUS

BACKGROUND OF THE INVENTION

Field of the Invention

The present invention relates to an imaging optical system and an imaging apparatus.

Description of the Related Art

The conventional imaging optical system has used an optical element called an apodization filter to obtain a good blur (defocus image). The apodization filter is a filter having a transmittance distribution in which the transmittance decreases as a position separates from an optical axis in a radial direction.

Each of Japanese Patent Laid-Open Nos. ("JPs") 2015-79128 and 2014-56280 discloses a filter having a transmittance distribution in which the transmittance decreases as the position separates from the optical axis. The filter disclosed in JP 2015-79128 includes a first transparent base material, a second transparent base material, and a transmittance characteristic changing member provided between the first transparent base material and the second transparent base material. The transmittance distribution of the filter disclosed in JP 2014-56280 is a Gaussian distribution in which a density of a light-shielding dot region decreases as the position separates from the optical axis.

JP 6-177006 discloses a filter having a transmittance distribution used for a projection lens in an exposure apparatus. The filter disclosed in JP 6-177006 is a pupil filter disposed at an aperture stop position for the projection lens and corresponding to a shape of a secondary light source for illuminating an original substrate.

The filters disclosed in JPs 2015-79128, 2014-56280, and 6-177006 can obtain a good defocus image, but causes a light amount of an on-axis light flux (focus image) to reduce.

SUMMARY OF THE INVENTION

The present invention provides an imaging optical system and an imaging apparatus, which can successfully acquire a defocus image as well as restraining a light quantity of a focus image from lowering.

An imaging optical system according to one aspect of the present invention includes at least one lens, and an optical element having a transmittance that changes in a radial direction perpendicular to an optical axis. The transmittance of the optical element is minimized at a first position in the radial direction separated from an optical axis position of the optical element by a distance smaller than an effective radius rd of the optical element. The transmittance at the first position is smaller than that at the optical axis position and that at a second position separated from the optical axis position by rd.

An imaging apparatus according to another aspect of the present invention includes the above imaging optical system, and an image sensor configured to photoelectrically convert an optical image formed via the imaging optical system.

Further features of the present invention will become apparent from the following description of exemplary embodiments with reference to the attached drawings.

DESCRIPTION OF THE EMBODIMENTS

Figure 1:
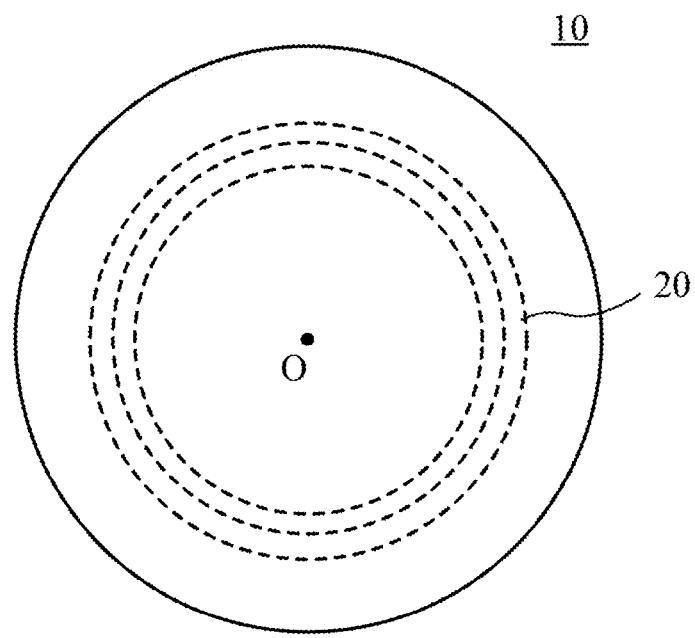
FIG. 1 is a sectional view of an optical element according to each example.

Referring now to the accompanying drawings, a description will be given of embodiments according to the present invention.

An optical system according to this embodiment is used to capture a three-dimensional object. Herein, a "three-dimensional object" includes a plurality of parts (regions) of the optical system having different distances in the optical axis direction, and in particular, an object having a point separated from a focal plane of the optical system by a depth of field or longer in imaging. At this time, a defocus image is formed on the imaging plane, and the defocus image can be recognized when the diameter of the defocus image is larger than about 1 to 2% of the image circle radius of the optical system. Here, the "image circle" is a circle imaged by a ray that passes through the effective diameter of the lens (the maximum diameter through which the light flux passes). When the optical system according to this embodiment is used as an optical system for a digital still camera, a video camera, or the like, the imaging plane is an imaging surface (or image capturing surface) of an image sensor (photoelectric conversion element) such as a CCD sensor or a CMOS sensor. When the optical system according to this embodiment is used as an optical system for a film-based camera, the imaging plane becomes a film plane. The above image circle radius may be the maximum image height of the imaging plane and the film surface in the imaging apparatus.

The optical system according to this embodiment includes a transmittance distribution element that gives a transmittance distribution to a light flux of each angle of view and changes a light amount distribution of the defocus image. In other words, the transmittance distribution element according to this embodiment has a transmittance distribution in which the transmittance changes in the radial direction perpendicular to the optical axis. Since the defocus image with a larger light amount at the outer peripheral portion has a clear contour, only the transmittance corresponding to the light flux at the peripheral portion of the defocus image may be set lower than that at the optical axis center. This embodiment will discuss the transmittance distribution element having a centrosymmetric transmittance distribution where the transmittance at the peripheral portion is smaller than that at the central portion.

The optical system according to this embodiment includes a plurality of lenses, an aperture stop configured to adjust the light amount, and the transmittance distribution element. The transmittance distribution element is an optical element having a nonuniform transmittance distribution. An absorptive or reflective material is vapor-deposited on a transparent glass flat plate or lens surface so as to have a predetermined transmittance distribution, and a light-sensitive material is coated and exposed so as to have a predetermined concentration. A concave lens made of a light absorptive material (ND glass) can also be used. The transmittance distribution may be variable by using an electrochromic material or the like. The optical element may be a pupil filter that corrects an aberration (such as a spherical aberration) of the optical system. The optical element is a filter configured to correct a point spread function ("PSF") of the defocus image. The optical element is disposed at the entrance pupil in the optical system. The disposition "at the entrance pupil" is not limited to the exact position of the entrance pupil, but may be a substantial entrance pupil position.

Figure 2:
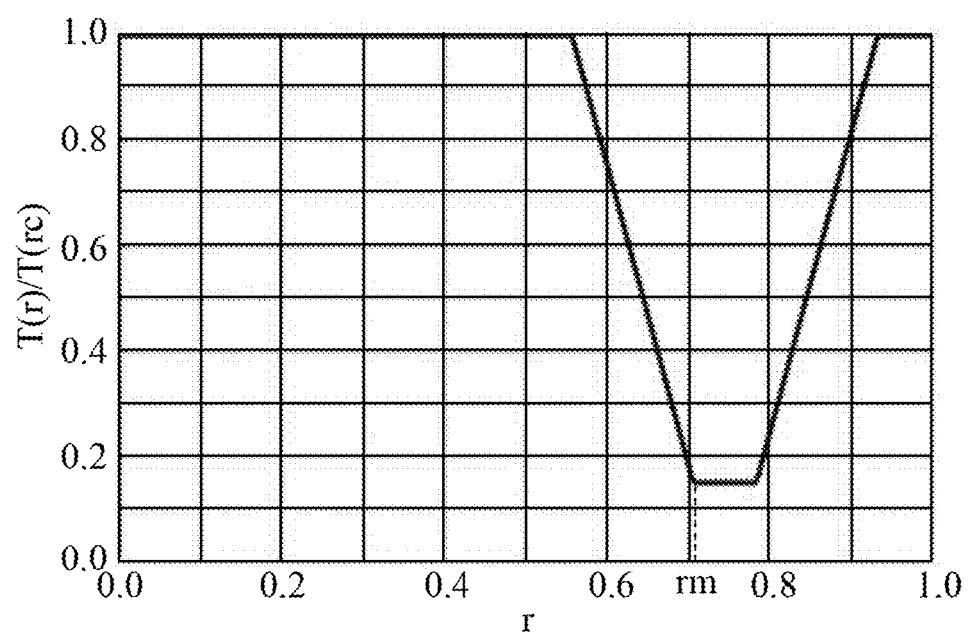
FIG. 2 illustrates a transmittance distribution of an optical element according to Example S1.
Figure 29:
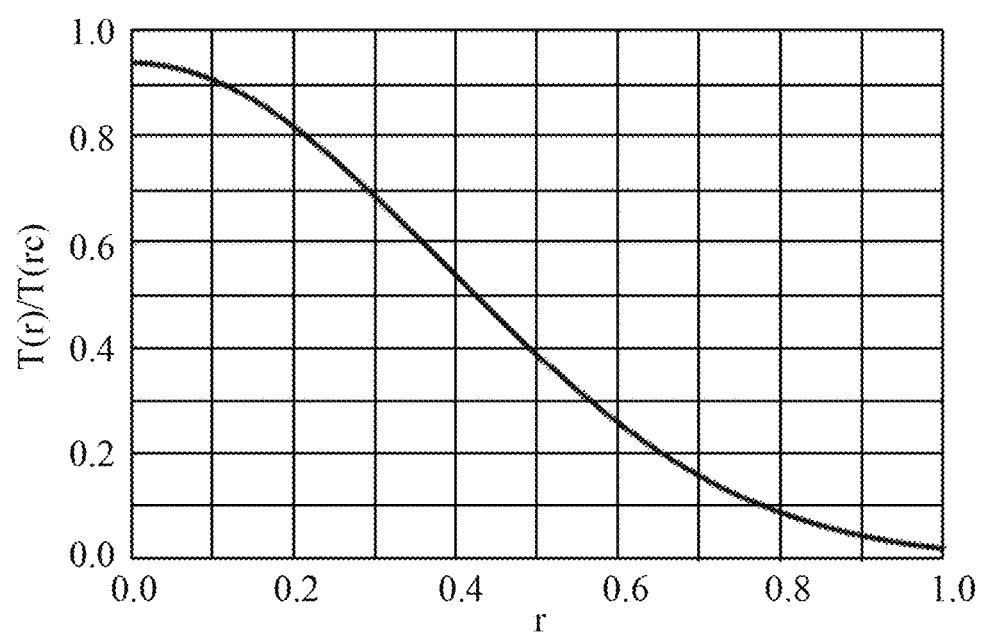
FIG. 29 illustrates a transmittance distribution of an optical element according to a comparative example.

Referring now to FIGS. 2 and 29, a description will be given of the transmittance distributions of the optical element 10 according to Example S1 and the optical element according to a comparative example. FIG. 2 illustrates a transmittance distribution of the optical element 10 according to Example S1. FIG. 29 illustrates the transmittance distribution of the optical element according to the comparative example. The optical element according to the comparative example has a Gaussian distribution type transmittance distribution. In each of FIGS. 2 and 29, the abscissa axis is a distance r (while the effective radius rd is set to 1.0) in the radial direction from the optical axis in the optical system. The radial direction is a direction separating from the optical axis in a plane perpendicular to the optical axis. The ordinate axis is T(r)/T(rc) or the transmittance. T(r) is a transmittance at the position with a distance r, T(rc) is a transmittance (or an on-axis transmittance (maximum transmittance) within the effective diameter) on the optical axis (optical axis center) within the effective diameter. The effective diameter is a diameter (maximum diameter) of the optical element through which the light flux passes. In FIG. 2, rm represents a radial distance from the optical axis up to a position where the transmittance of the optical element 10 becomes a minimum transmittance within the effective diameter.

As illustrated in FIG. 29, the optical system includes the optical element according to the comparative example disposed near the aperture stop and can reduce the light flux corresponding to the portion causing the uneven intensity of the defocus image. Hence, the defocus image can be successfully acquired. However, in this Gaussian distribution type transmittance distribution, the transmittance of the light reduces which passes near the effective diameter irrelevant to the uneven intensity of the defocus image, and a light amount reduction of the defocus image and the associated size reduction of the defocus image are inevitable.

Accordingly, this embodiment uses the optical element 10 illustrated in FIG. 2. In the optical element 10 according to this embodiment (Example S1), the transmittance is as constant as 1.0 from the optical axis to r of about 0.55 and linearly decreases from r of about 0.55 to the distance rm of 0.712. The transmittance is as constant as about 0.16 from rm of 0.712 to r of 0.78. The transmittance linearly increases from r of about 0.78 to r of about 0.93. The transmittance is as constant as 1.0 in a range where r is larger than 0.93. This configuration can successfully acquire the defocus image while suppressing a decrease in a light amount of the axial light flux.

Referring now to FIG. 1, a description will be given of a configuration of the optical element 10 according to this embodiment. FIG. 1 is a schematic diagram of the optical element 10. As illustrated in FIG. 1, the optical element 10 includes a light shield portion 20 made of a plurality of dot-shaped light shielding regions surrounding the position of an optical axis O (optical axis position (on-axis position in the optical element)). The light can be diffused at random by concentrically disposing the light shield portion 20 around the optical axis O on the optical element 10 and by utilizing the light diffraction effect. This configuration can effectively reduce the light flux corresponding to the portion which causes the uneven intensity of the defocus image, and consequently successfully acquire the defocus image. As long as the light shield portion 20 in this specification has a function of reducing part of the light flux to the image plane among the light entering the optical element 10, the light shield portion 20 does not have to completely shield the light entering the light shield portion 20.

In this embodiment, each dot of the light shield portion 20 is, but not limited to, a rectangle (square), and may have another shape such as a circle, a regular pentagon, a regular hexagon, and an ellipse. The light shield portion 20 in this embodiment is formed as, but not limited to, three line shapes having different radial distances from the optical axis O. This embodiment forms the light shield portion 20 as a plurality of concentric light shield portions, but this embodiment is not limited to this example and may form it as a concentric line pattern (linear shielding region). A plurality of line patterns having different radial distances from the optical axis O may be formed as concentric circular line patterns. This embodiment concentrically forms, but is not limited to, the line patterns of the light shield portions 20. As long as the line patterns may be formed annularly, they may be formed elliptically, for example.

In general optical systems, vignetting is observed in the off-axis light flux. The "vignetting" means that part of the light flux is shielded. In an optical system having the vignetting, since an area in the aperture stop is different between the on-axis light flux and the off-axis light flux, the effect obtained by the transmittance distribution element differs according to the angle of view. In general, since the off-axis light flux passes through a narrower range in the aperture stop than the on-axis light flux, when the transmittance distribution corresponds to the on-axis light flux, the off-axis light flux cannot provide the effect of the transmittance distribution. When the transmittance distribution element is distant from the aperture stop, the center of the off-axis light flux is separated from the optical axis and the transmittance of the off-axis light flux becomes asymmetric in the centrosymmetric transmittance distribution.

Accordingly, this embodiment addresses an upside down relationship of the shape of the off-axis light flux between a position separated from the aperture stop toward the object side and a position separated from the aperture stop toward the image side, and may dispose at least one optical element 10 near the aperture stop. Thereby, the transmittance distribution of the off-axis light flux can be close to the equivalent centrosymmetry. When the improvement effect of the defocus image at the off-axis field angle is emphasized, the apodization effect for the off-axis light flux can be effectively obtained by placing the optical element having the transmittance distribution near the aperture stop. The object of this embodiment is to successfully acquire the defocus image while suppressing a decrease in a light amount of the focus image.

Where rd is an effective radius (the maximum diameter through which the light flux passes) of the optical element 10, $T(r)$ is a transmittance of the optical element 10 at a distance r ($0 \leq r \leq rd$) from the optical axis O, and rm ($r<rm$ or $rm<m$) is a distance r that minimizes the transmittance of the optical element 10, the optical element 10 satisfies $T(r)>T(rm)$. Satisfying this condition can successfully correct the defocus image while suppressing a decrease of the on-axis transmittance.

This embodiment may satisfy the following conditional expression (1).

$$0.10 < rm/rd < 0.95 \tag{1}$$

The conditional expression (1) is used to properly set a ratio between the distance rm from the optical axis O at which the transmittance of the optical element 10 becomes the minimum and the effective radius rd of the optical element 10. As the diameter of the optical element 10 increases, it is difficult to successfully acquire the defocus image due to the influence of the spherical aberration. It is thus important to set these two factors in a well-balanced manner in order to suppress the decrease of the on-axis transmittance while improving the defocus image. If the conditional value exceeds the upper limit value in the conditional expression (1), the distance rm from the optical axis O which minimizes the transmittance for the effective radius rd of the optical element 10 becomes too long and it is difficult to suppress the reduction of the on-axis transmittance of the optical system in order to obtain a good defocus image.

This embodiment may satisfy the following conditional expression (2).

$$0.10 < ra/rm < 0.98 \tag{2}$$

In the conditional expression (2), ra represents the distance from the optical axis O which makes the transmittance of the optical element 10 equal to $\{T(rc)-T(rm)\}/2=T(ra)$ where $T(rc)$ is the on-axis transmittance. The conditional expression (2) is used to properly set a ratio between the distance ra and the distance rm. Satisfying the conditional expression (2) can successfully acquire the defocus image while suppressing the decrease in the transmittance of the on-axis light flux. If the conditional value exceeds the upper limit in the conditional expression (2), the on-axis transmittance of the optical element 10 excessively decreases and it is difficult to improve the defocus image. If the conditional value is less than the lower limit value in the conditional expression (2), it becomes difficult to suppress the reduction in the on-axis transmittance of the optical system.

This embodiment may satisfy the following conditional expression (3).

$$1.04 < rb/rm < 4.5 \tag{3}$$

In the conditional expression (3), rb is a distance from the optical axis O which makes the transmittance of the optical element 10 equal to $\{T(rd)-T(rm)\}/2$. The conditional expression (3) is used to properly set a ratio between the distance rb and the distance rm. Satisfying the conditional expression (3) can successfully acquire the defocus image while suppressing the decrease in the transmittance of the on-axis light flux. When the conditional value exceeds the upper limit value in the conditional expression (3), the on-axis transmittance of the optical element 10 abruptly and excessively increases and it is difficult to improve the defocus image. If the conditional value is less than the lower limit value in the conditional expression (3), it becomes difficult to suppress the reduction in the on-axis transmittance of the optical system.

This embodiment may satisfy the following conditional expression (4).

$$0.01 < T(rm)/T(rd) < 0.95 \tag{4}$$

The conditional expression (4) is used to properly set a ratio of the minimum transmittance $T(rm)$ of the optical element 10 to the transmittance $T(rd)$ at the effective radius rd of the optical element 10. Satisfying the conditional expression (4) can successfully acquire the defocus image while suppressing the reduction in the transmittance of the on-axis light flux. If the conditional value exceeds the upper limit value in the conditional expression (4), the transmittance $T(rd)$ of the optical element 10 at the effective radius rd becomes too low. Thus, it becomes difficult to suppress the reduction in the on-axis transmittance of the optical system. If the conditional value is lower than the lower limit in the conditional expression (4), the transmittance $T(rd)$ of the optical element 10 at the effective radius rd rapidly increases and it difficult to successfully acquire the defocus image.

This embodiment may satisfy the following conditional expression (5).

$$|SAmax|/f < 0.01 \tag{5}$$

In the conditional expression (5), SAmax is a maximum value of the spherical aberration in the d-line marginal ray, and f is a focal length (mm) of the optical system (overall lens system). The conditional expression (5) is used to properly set a ratio of the maximum value of the spherical aberration in the d-line marginal ray to the focal length of the overall lens system. Satisfying the conditional expression (5) can suppress an amount of spherical aberration of the optical system, and successfully acquire the defocus image while suppressing the reduction in the on-axis transmittance of the optical element 10. If the conditional value exceeds the upper limit value in the conditional expression (5), the spherical aberration of the optical system excessively increases. Thus, the resolving power of the optical system lowers, and it is difficult to suppress the decrease in the on-axis transmittance while successfully acquiring the defocus image.

This embodiment may satisfy the following conditional expression (6).

$$2.0 < f/Fno < 500.0 \tag{6}$$

In conditional expression (6), Fno is the open F-number (the minimum value of the F-number of the aperture stop). The conditional expression (6) is used to properly set a ratio between the focal length f(mm) of the optical system (the overall lens system) and the open F-number Fno. The conditional expression (6) relates to the entrance pupil diameter of the optical system. If the conditional value exceeds the upper limit value in the conditional expression (6), the outline of the defocus image becomes too conspicuous and it becomes difficult to suppress the decrease in the on-axis transmittance while successfully acquiring the defocus image.

This embodiment may satisfy the following conditional expression (7).

$$0.15 < fa/f < 10.0 \tag{7}$$

In conditional expression (7), fa is a focal length of the optical system on the object side of the aperture stop. The conditional expression (7) is used to properly set a ratio between the focal length fa and the focal length f. Disposing the aperture stop at a position that satisfies the conditional expression (7) can effectively improve the defocus image. This configuration can make the transmittance distribution of the off-axis light flux close to the equivalent centrosymmetry.

This embodiment may satisfy the following conditional expression (8).

$$0.01 < La/Ld < 0.95 \tag{8}$$

In the conditional expression (8), La represents a length on the optical axis from the aperture stop to the image plane (imaging plane), and Ld represents a length on the optical axis from the first lens surface (lens surface closest to the object) to the image plane (including an optical filter corresponding to a low-pass filter, a protective glass, or the like). The conditional expression (8) is used to properly set a ratio between the length Ld and the length La.

This embodiment may satisfy the following conditional expression (9).

$$0.1 < fa/fb < 10.0 \tag{9}$$

In conditional expression (9), fb is a focal length of the optical system on the image side of the aperture stop. The conditional expression (9) is used to properly set a ratio of the focal length fa of the optical system closer to the object side than the aperture stop to the focal length fb of the optical system closer to the image side than the aperture stop. Satisfying the conditional expression (9) can properly dispose the aperture stop and miniaturize the aperture diameter so that the transmittance distribution of the off-axis light flux can be close to the centrosymmetry while properly setting the aperture stop. If the conditional value exceeds the upper limit value in the conditional expression (9), the focal length fa of the optical system closer to the object side than the aperture stop becomes too long. In this case, it is difficult to suppress the degradation of image quality caused by the shading, particularly in an imaging apparatus including an image sensor, such as a CCD sensor and a CMOS sensor. If the conditional value is lower than the lower limit value in the conditional expression (9), the focal length fa becomes too short. Therefore, the focal length on the image side of the aperture stop at the wide-angle end is too short. As a result, it is difficult to make centrosymmetric the transmittance distribution of the off-axis light flux in order to suppress the coma aberration and lateral chromatic aberration in the optical system (the overall lens system).

Each dot of the light shield portion 20 may be a square and this embodiment may satisfy the following conditional expression (10).

$$0.10 < d < 1.00 \tag{10}$$

In the conditional expression (10), d (mm) is a size per dot area (a length of one side of each dot when each dot has a square shape) of the light shield portion 20 formed in the optical element 10. The conditional expression (10) is used to properly set the size per dot area of the light shield portion 20 in the region having the minimum transmittance T(rm) of the optical element 10. If the conditional value exceeds the upper limit value in the conditional expression (10), the size per dot area becomes too large, the light shield portion 20 becomes nonuniform, and it becomes difficult to suppress the deterioration of the defocus image. If the conditional value is less than the lower limit value in the conditional expression (10), the size per dot area becomes too small and a diffraction pattern like the mandala undesirably occurs.

Each dot of the light shield portion 20 may be a rectangle, and this embodiment may satisfy the following conditional expression (11).

$$0.05 < ad/bd < 0.95 \tag{11}$$

In conditional expression (11), ad is a length of the rectangle of one dot region of the light shield portion 20 in the short side direction, and bd is a length of the rectangle of the one dot region in the long side direction. The conditional expression (11) is used to properly set a ratio of the length ad of the one dot region of the light shield portion 20 in the short side direction to the length bd in the long side direction. If the conditional value exceeds the upper limit value in the conditional expression (11), the length ad in the short side direction becomes too long and it becomes difficult to suppress the deterioration of the defocus image. If the conditional value is less than the lower limit value in the conditional expression (11), the length bd in the short side direction becomes too small and a diffraction pattern like the mandala undesirably occurs.

This embodiment may satisfy the following conditional expressions (1a) to (9a) in the conditional expressions (1) to (9).

$$0.33 < rm/rd < 0.92 \tag{1a}$$

$$0.29 < ra/rm < 0.95 \tag{2a}$$

$$1.05 < rb/rm < 2.688 \tag{3a}$$

$$0.06 < T(rm)/T(rd) < 0.85 \tag{4a}$$

$$|SAmax|/f < 0.003 \tag{5a}$$

$$8.46 < f/Fno < 128 \tag{6a}$$

$$0.36 < fa/f < 8.49 \tag{7a}$$

$$0.11 < La/Ld < 0.80 \tag{8a}$$

$$0.24 < fa/fb < 7.50 \tag{9a}$$

The following conditional expressions (1a) to (9a) may satisfy the conditional expressions (1b) to (9b).

$$0.654 < rm/rd < 0.907 \tag{1b}$$

$$0.582 < ra/rm < 0.932 \tag{2b}$$

$$1.061 < rb/rm < 1.344 \tag{3b}$$

$$0.116 < T(rm)/T(rd) < 0.770 \tag{4b}$$

$$|SAmax|/f < 0.00173 \tag{5b}$$

$$16.928 < f/Fno < 63.587 \tag{6b}$$

$$0.712 < fa/f < 4.244 \tag{7b}$$

$$0.211 < La/Ld < 0.704 \tag{8b}$$

$$0.436 < fa/fb < 5.436 \tag{9b}$$

The distortion and lateral chromatic aberration (chromatic aberration of magnification) among various aberrations of the optical system may be corrected through electrical image processing. A transmittance distribution can be changed in response to the aperture diameter (or the F-number). This embodiment may change a transmittance distribution based on the PSF of the defocus image.

Next follows a description of the optical systems LA according to Examples 1 to 7 (numerical examples 1 to 7) and the optical elements 10 according to Examples S2 to S10.

Figure 3:
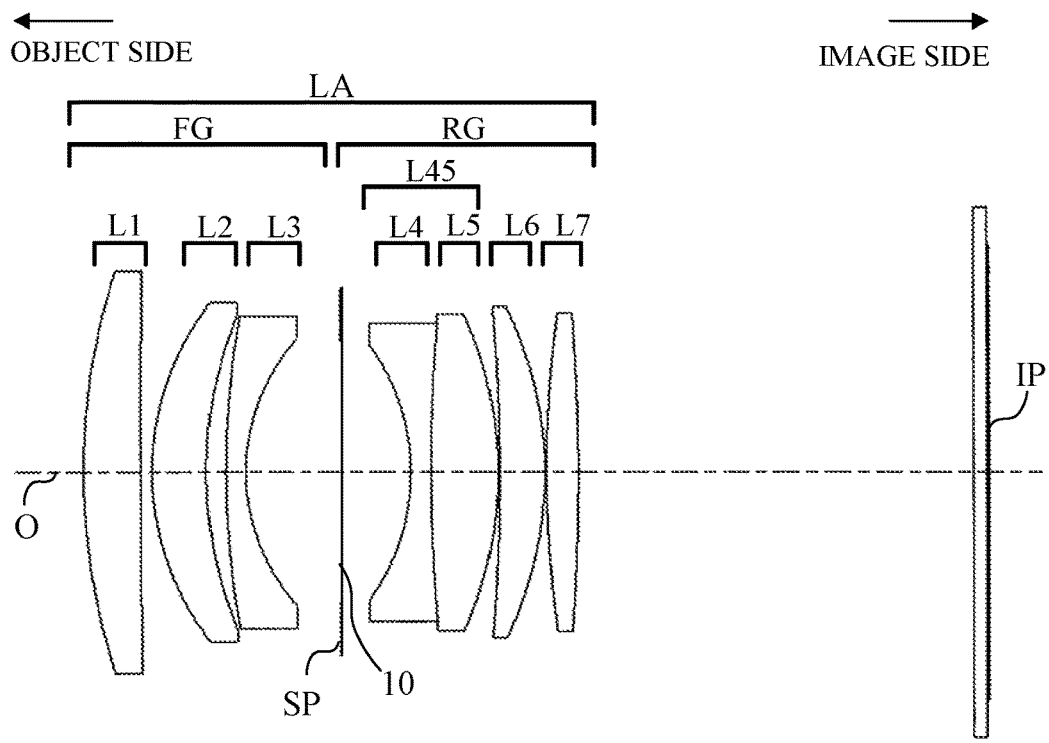
FIG. 3 is a sectional view of the optical system at infinity according to Example 1.
Figure 4:
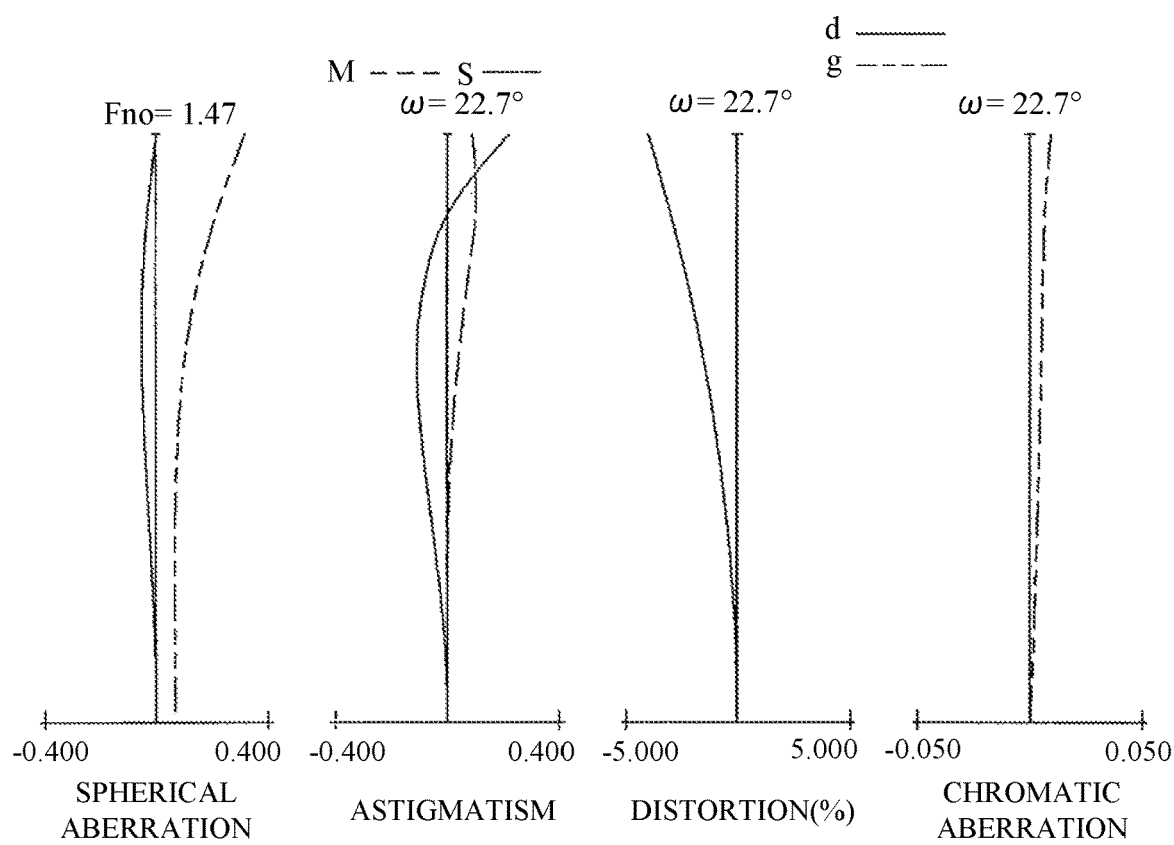
FIG. 4 is an aberration diagram of the optical system at infinity according to Example 1.
Figure 5:
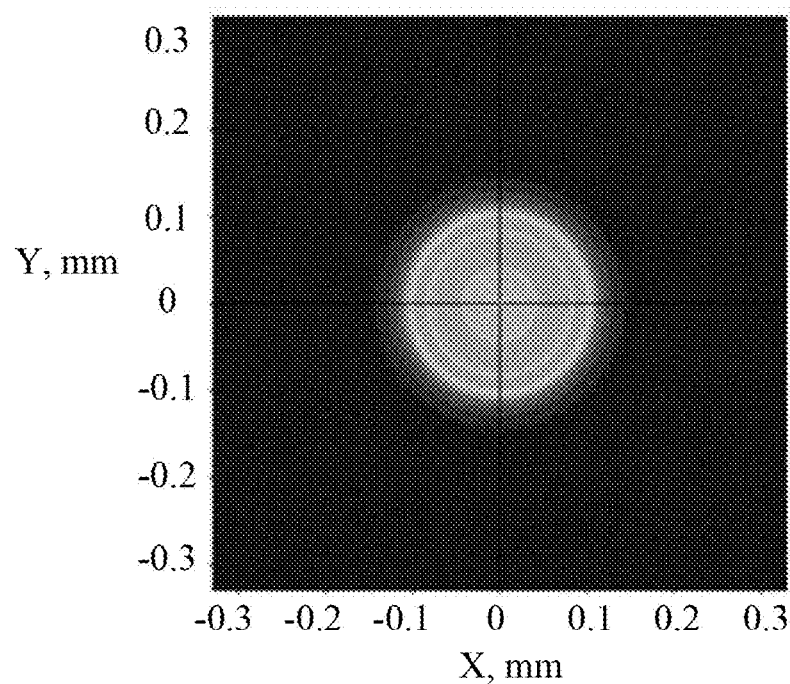
FIG. 5 is an on-axis point spread function ("PSF") of a defocus image according to Example 1.
Figure 6:
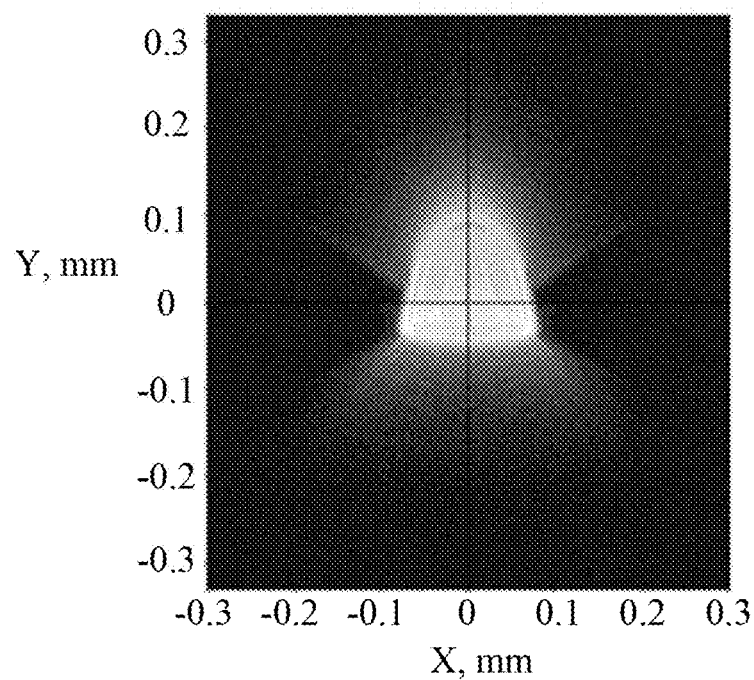
FIG. 6 illustrates a PSF at an image height of 70% of the defocus image according to Example 1.
Figure 7:
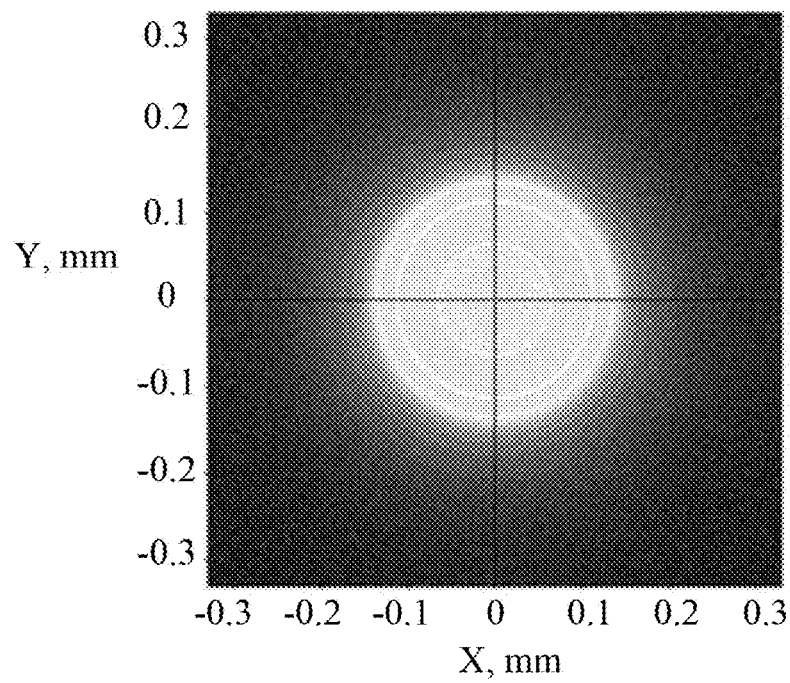
FIG. 7 illustrates an on-axis PSF of the image according to Example 1.
Figure 8:
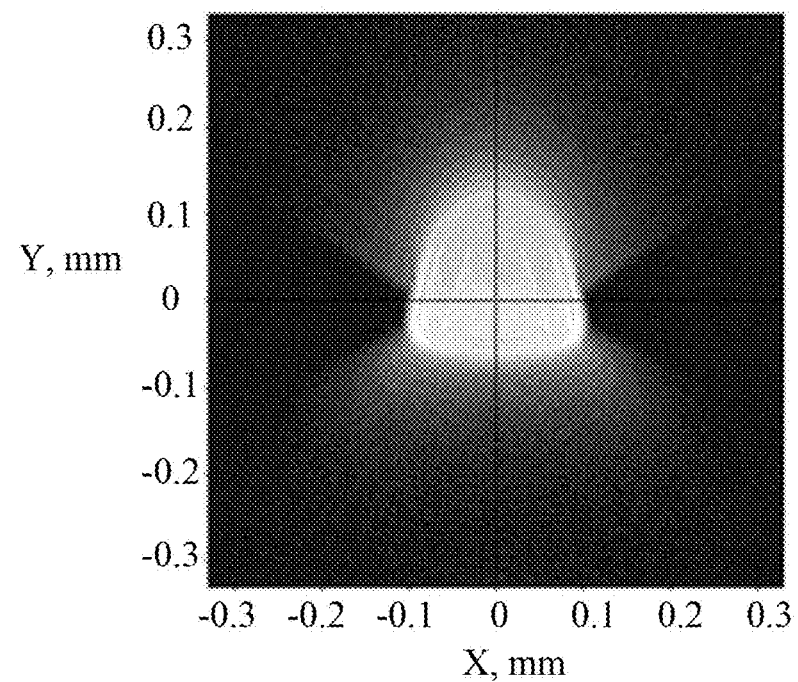
FIG. 8 illustrates a PSF at the image height of 70% of the image according to Example 1.
Figure 9:
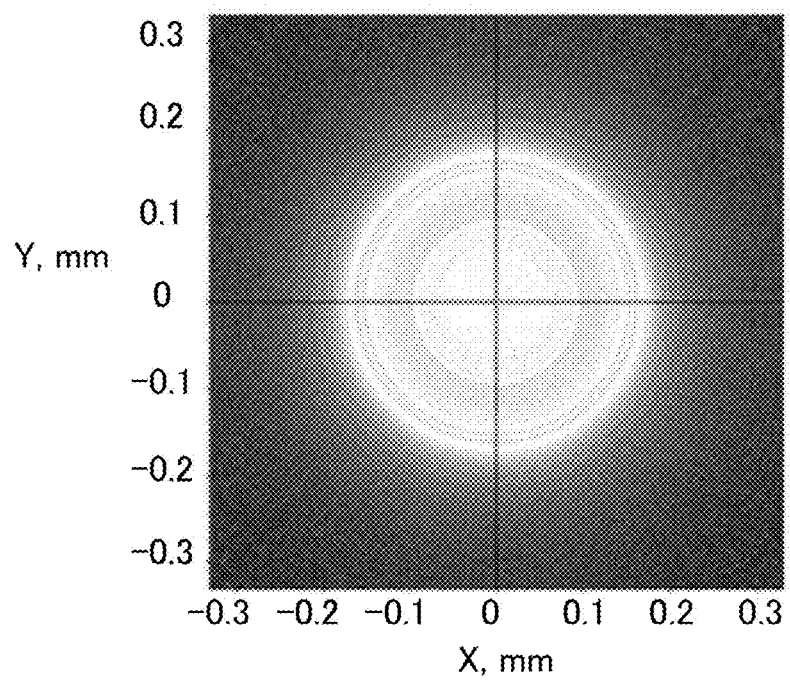
FIG. 9 illustrates an on-axis PSF of the defocus image according to Example 1.
Figure 10:
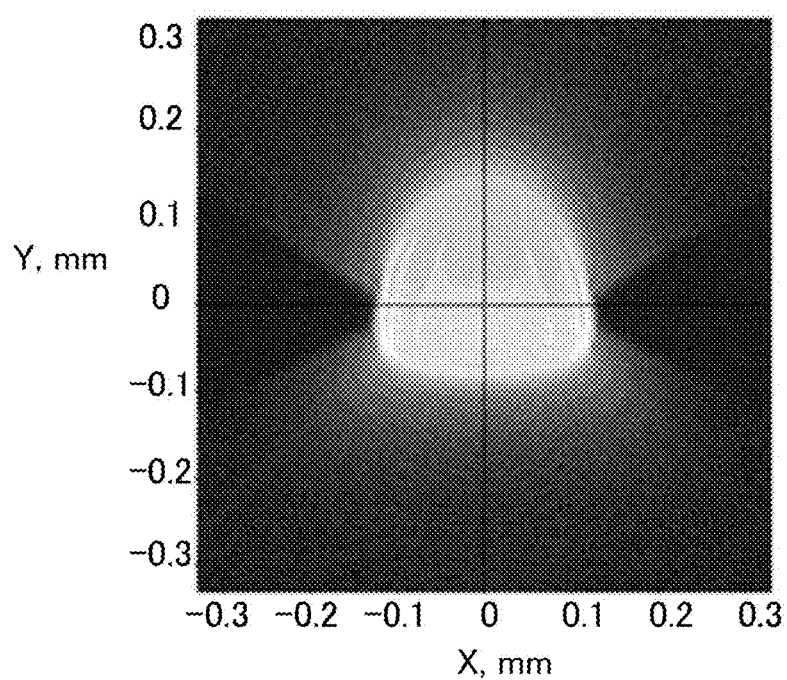
FIG. 10 illustrates a PSF of the image height of 70% of the defocus image according to Example 1.
Figure 11:
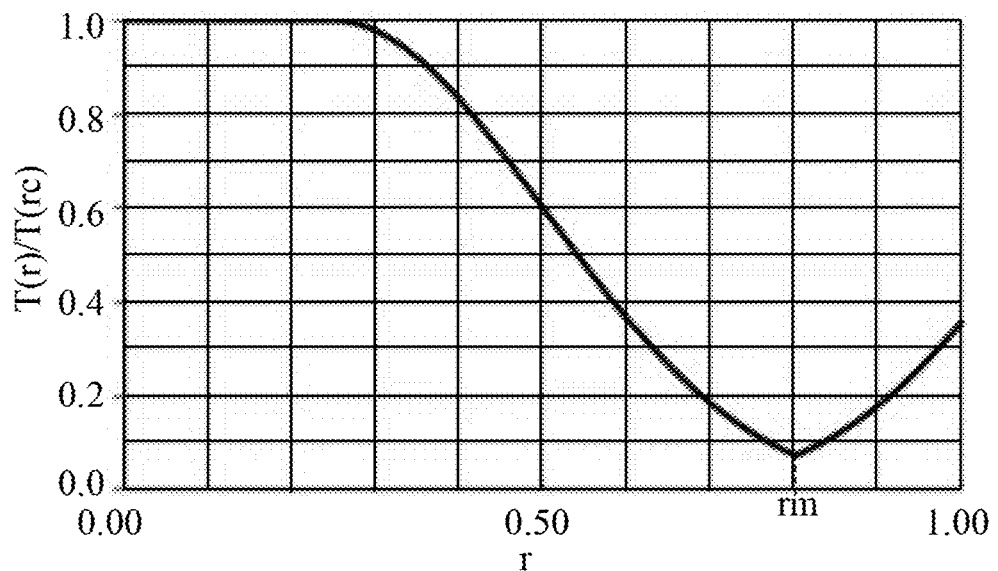
FIG. 11 illustrates a transmittance distribution of an optical element according to Example S2.
Figure 12:
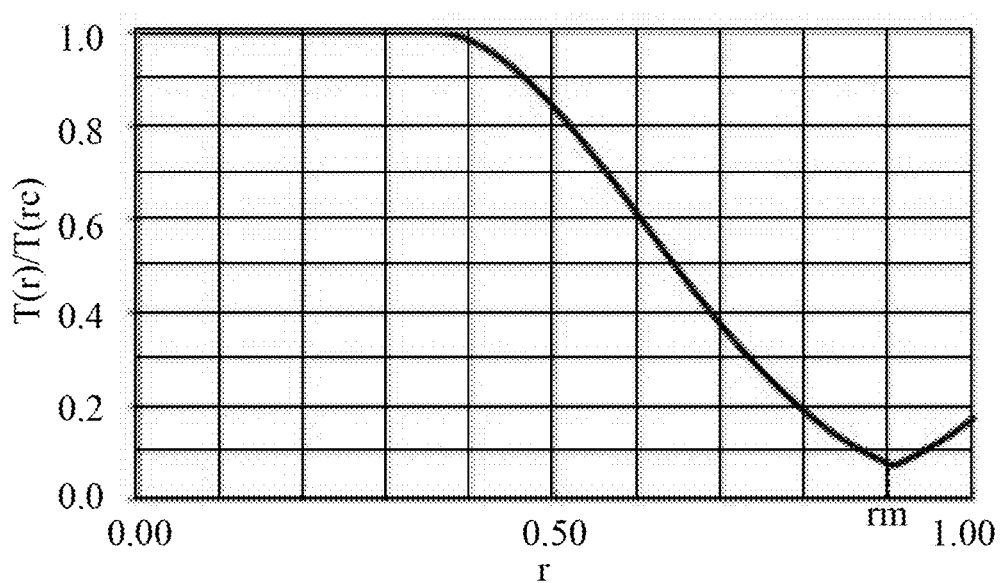
FIG. 12 illustrates a transmittance distribution of an optical element according to Example S3.
Figure 13:
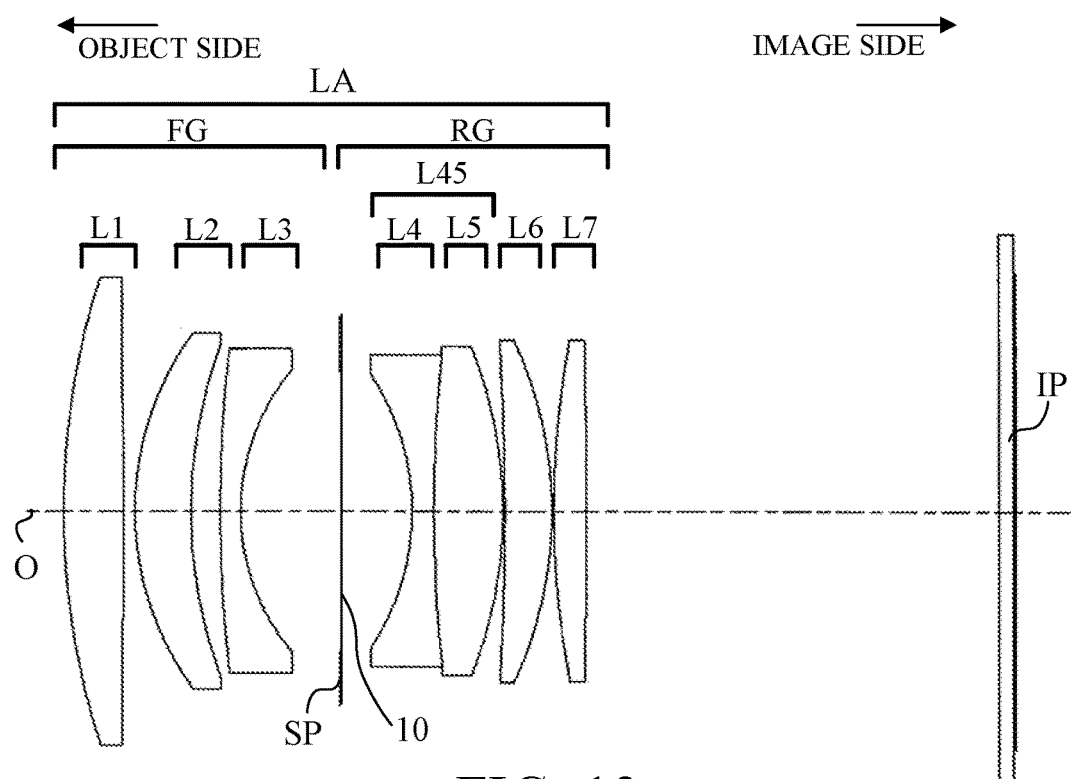
FIG. 13 is a sectional view of an optical system at infinity according to Example 2.
Figure 14:
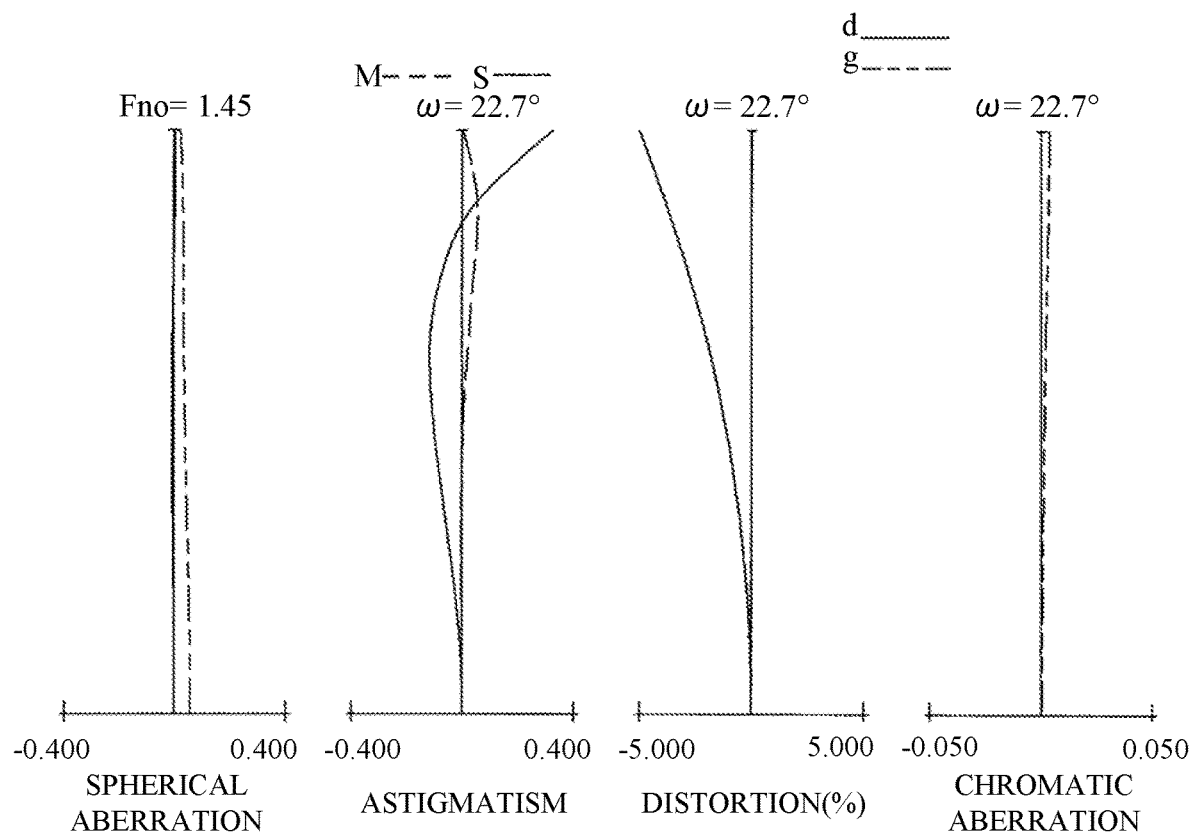
FIG. 14 is an aberration diagram of the optical system at infinity according to Example 2.

FIG. 3 is a sectional view of the optical system LA focused on infinity according to Example 1 (numerical example 1). FIG. 4 is an aberration diagram of the optical system LA focused on infinity according to Example 1. FIG. 5 illustrates a PSF of an on-axis defocus image formed on the image plane IP according to Example 1. FIG. 6 illustrates a PSF of a defocus image at an image height of 70% formed on the image plane IP according to Example 1. The PSFs of the defocus images in FIGS. 5 and 6 are PSFs separated from the image plane IP by 40f where "f" is a focal length of the optical system LA, when a position separated from the image plane IP by 50f is focused. FIG. 7 illustrates a PSF of an on-axis image formed on the image plane IP according to Example 1. FIG. 8 illustrates a PSF of an image at an image height of 70% formed on the image plane IP according to Example 1. The PSFs of the images illustrated in FIGS. 7 and 8 are obtained when a position separated from the image plane IP by 50f is focused. FIG. 9 illustrates a PSF of an on-axis defocus image formed on the image plane IP according to Example 1. FIG. 10 illustrates a PSF of a defocus image at an image height of 70% formed on the image plane IP according to Example 1. The defocus images illustrated in FIGS. 9 and 10 have PSFs at a position separated from the image plane IP by 70f when a position separated from the image plane IP by 50f is focused. FIG. 11 illustrates the transmittance distribution of the optical element according to Example S2 used for the optical system LA according to Example 1. FIG. 12 illustrates the transmittance distribution of the optical element according to Example S3. FIG. 13 is a sectional view of the optical system LA focused on infinity according to Example 2 (numerical example 2). FIG. 14 is an aberration diagram of the optical system LA focused on infinity according to Example 2.

As illustrated in FIG. 11, the optical element 10 according to Example S2 has a transmittance that is as constant as 1.0 from the optical axis to r of about 0.25, decreases from r of about 0.25 to a distance rm of 0.805, is about 0.07 at rm of 0.805, and then increases as the position separates from rm of 0.805.

As illustrated in FIG. 12, the optical element 10 according to Example S3 has a transmittance that is as constant as 1.0 from the optical axis to r of about 0.35, decreases from about r=0.35 to the distance rm of 0.907, is about 0.07 at rm of 0.907, and then increases as the position separates from rm of 0.907.

As illustrated in FIGS. 3 and 13, each of the optical systems LA according to Examples 1 to 4 (numerical examples 1 to 4) includes, in order from the object side to the image side, a front unit (or group) FG having a positive refractive power, an aperture stop SP, and a rear unit RG having a positive refractive power. The front unit FG includes, in order from the object side to the image side, a positive lens L1 having a convex surface facing the object side, a positive lens L2 having a concave surface facing the image side, and a negative lens L3 having a concave surface facing the image side. The rear unit RG includes, in order from the object side to the image side, a cemented lens L45 as a negative lens made by joining a negative lens L4 having a concave surface facing the object side and a positive lens L5 with each other, a positive lens L6, and a positive lens L7.

Figure 15:
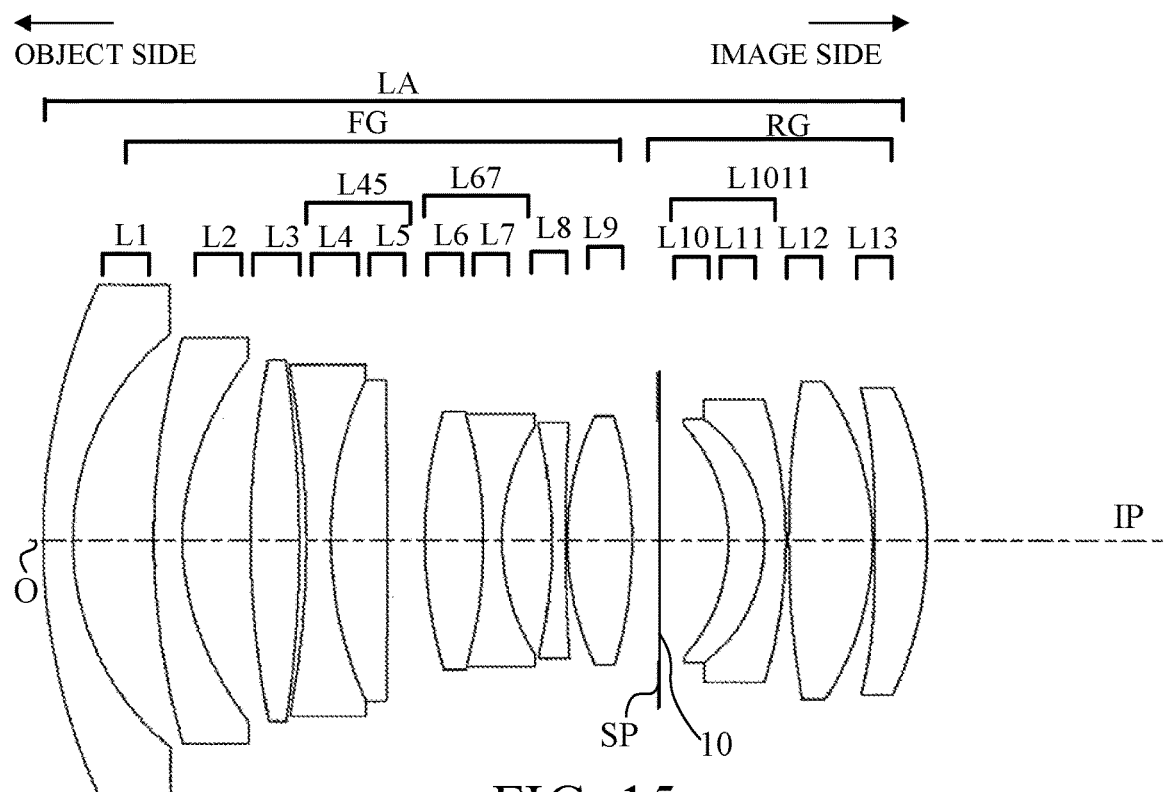
FIG. 15 is a sectional view of an optical system at infinity according to Example 3.
Figure 16:
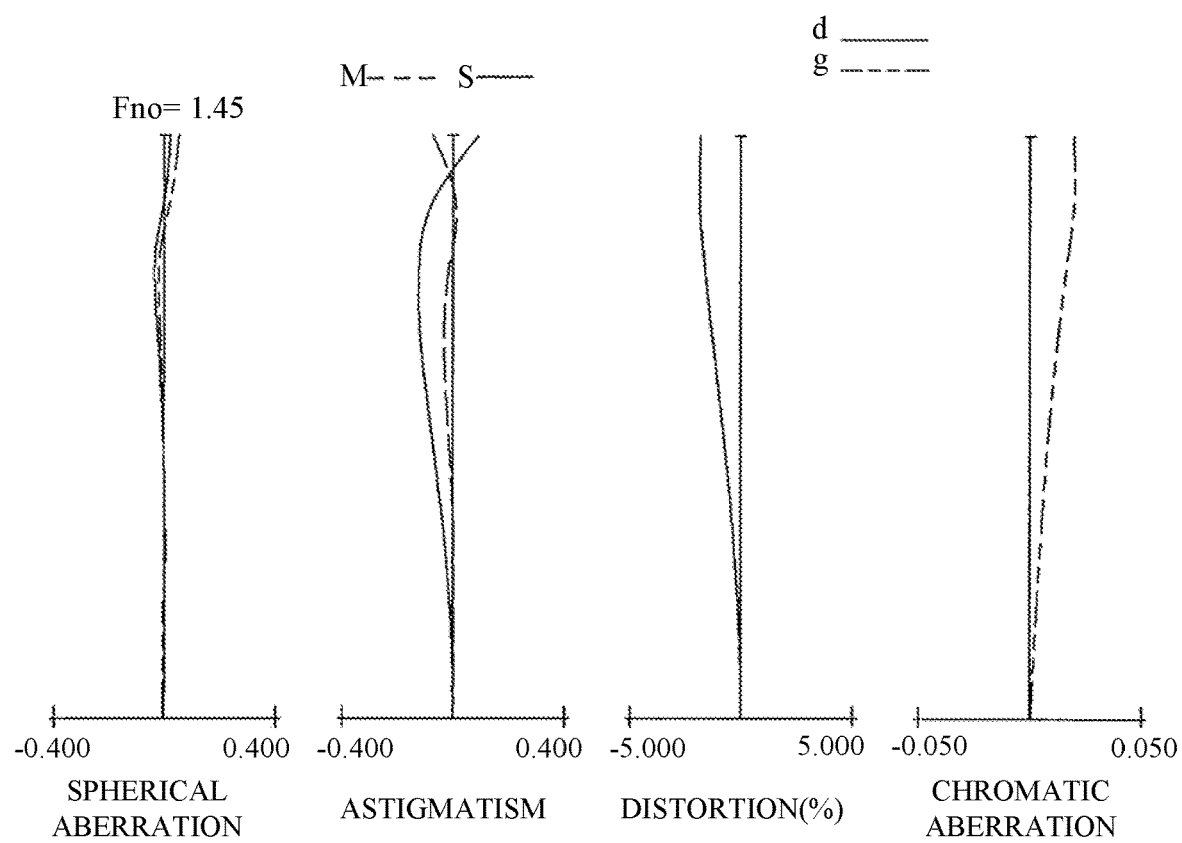
FIG. 16 is an aberration diagram of the optical system at infinity according to Example 3.

FIG. 15 is a sectional view of the optical system LA focused on infinity according to Example 3 (numerical example 3). FIG. 16 is an aberration diagram of the optical system LA focused on infinity according to Example 3. As illustrated in FIG. 15, the optical system LA according to Example 3 includes, in order from the object side to the image side, a front unit FG having a positive refractive power, an aperture stop SP, and a rear unit RG having a positive refractive power. The front unit FG includes, in order from the object side to the image side, a negative lens L1, a negative lens L2, a positive lens L3, a cemented lens L45 as a positive lens, a cemented lens L67 as a positive lens, a negative lens L8, and a positive lens L9. The cemented lens L45 is made by joining a negative lens L4 and a positive lens L5 with each other. The cemented lens L67 is formed by joining a positive lens L6 and a negative lens L7 with each other. The rear unit RG includes, in order from the object side to the image side, a cemented lens L1011 as a negative lens made by joining a positive lens L10 and a negative lens L11 with each other, a positive lens L12, and a positive lens L13.

Figure 17:
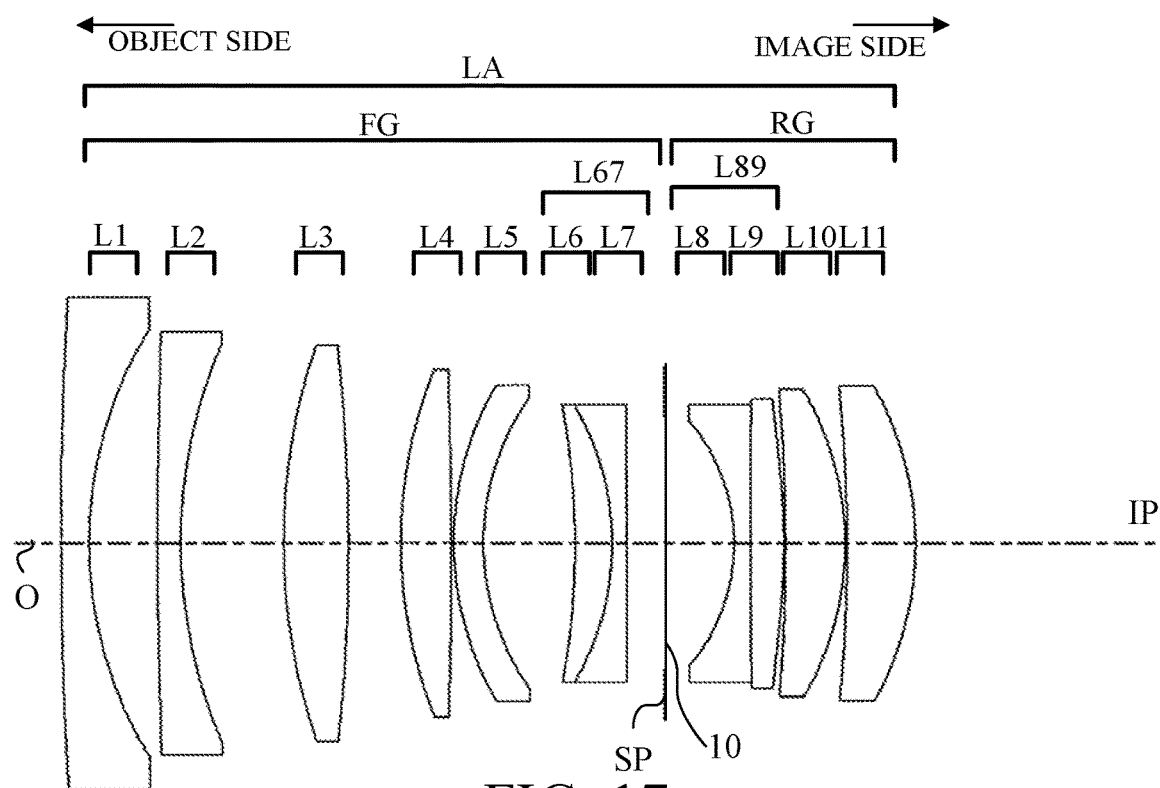
FIG. 17 is a sectional view of an optical system at infinity according to Example 4.
Figure 18:
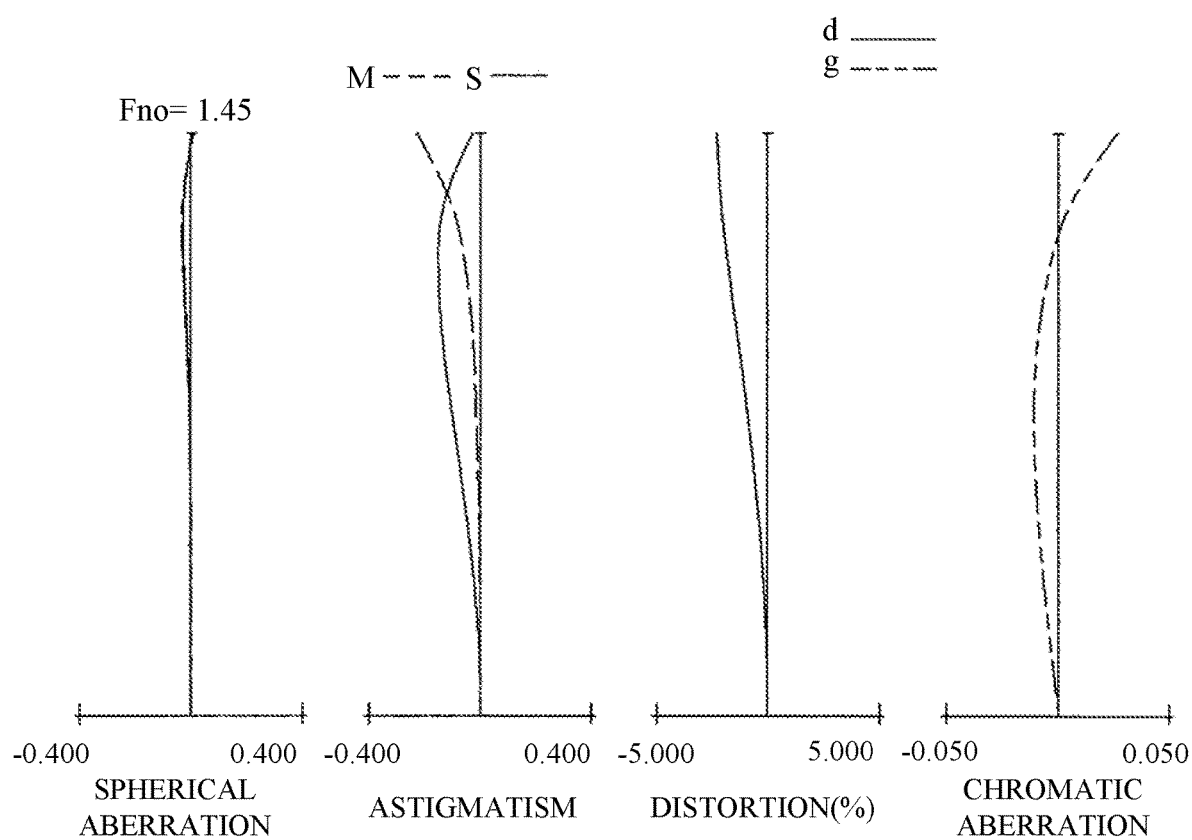
FIG. 18 is an aberration diagram of the optical system at infinity according to Example 4.

FIG. 17 is a sectional view of the optical system LA focused on infinity according to Example 4 (numerical example 4). FIG. 18 is an aberration diagram of the optical system LA focused on infinity according to Example 4. As illustrated in FIG. 17, the optical system LA according to Example 4 includes, in order from the object side to the image side, a front unit FG having a positive refractive power, an aperture stop SP, and a rear unit RG having a positive refractive power. The front unit FG includes, in order from the object side to the image side, a negative lens L1, a negative lens L2, a positive lens L3, a positive lens L4, a negative lens L5, and a cemented lens L67 having a negative refractive power. The cemented lens L67 is made by joining a positive lens L6 and a negative lens L7 with each other. The rear unit RG includes, in order from the object side to the image side, a cemented lens L89 as a negative lens, a positive lens L10, and a positive lens L11.

The cemented lens L89 is formed by joining a negative lens L8 and a negative lens L9 with each other.

Figure 19:
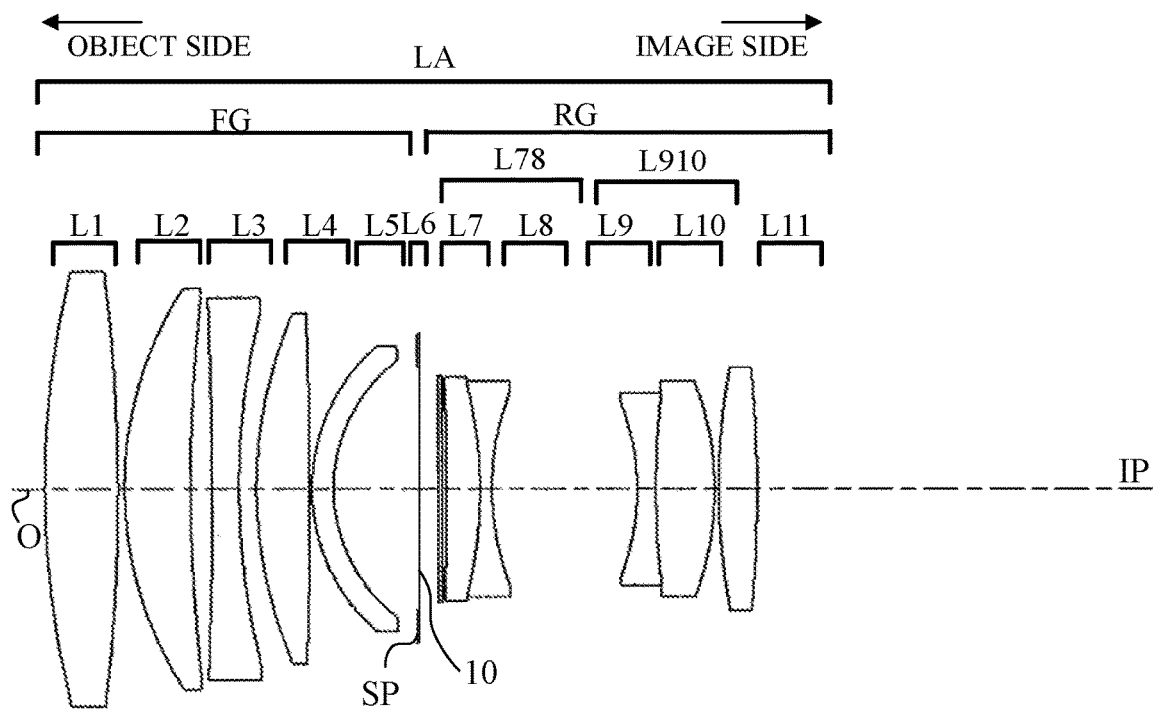
FIG. 19 is a sectional view of an optical system at infinity according to Example 5.
Figure 20:
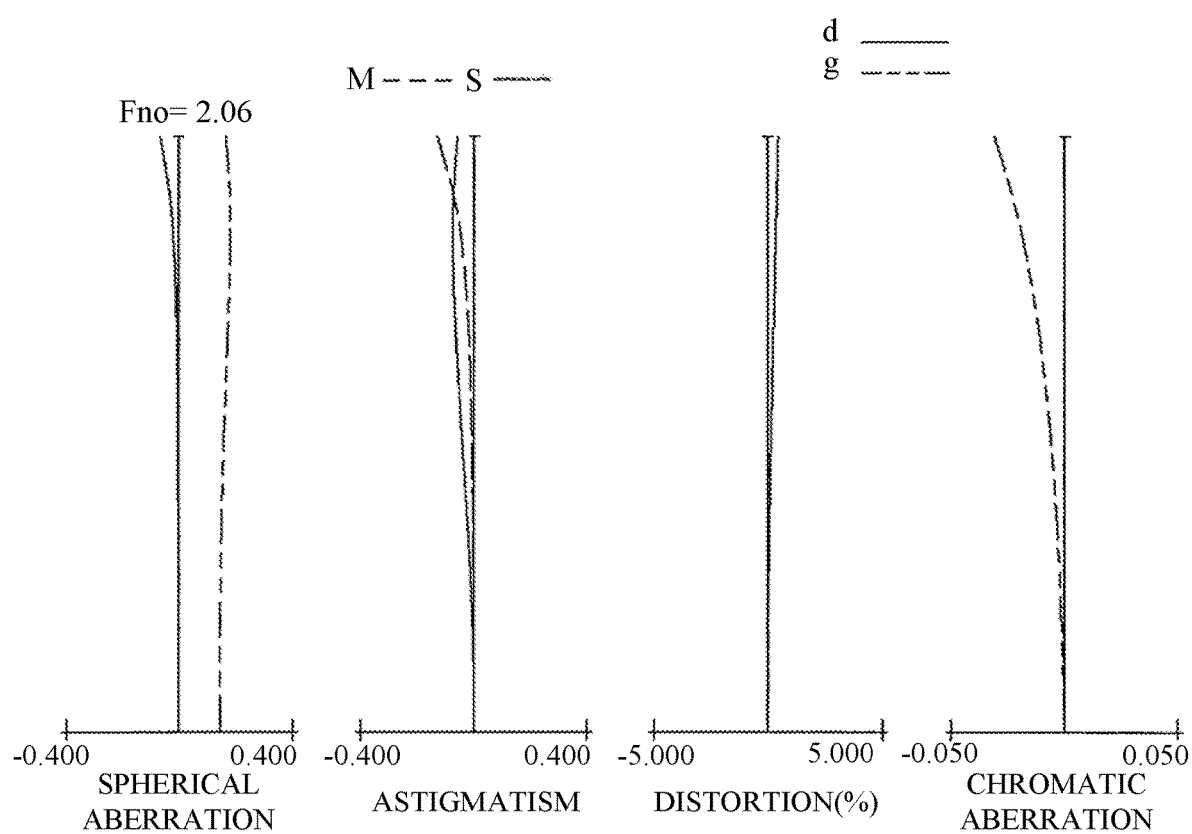
FIG. 20 is an aberration diagram of the optical system at infinity according to Example 5.

FIG. 19 is a sectional view of the optical system LA focused on infinity according to Example 5 (numerical example 5). FIG. 20 is an aberration diagram of the optical system LA focused on infinity according to Example 5. The optical system LA according to Example 5 includes, in order from the object side to the image side, a front unit FG having a positive refractive power, an aperture stop SP, and a rear unit RG having a positive refractive power. The front unit FG includes, in order from the object side to the image side, a positive lens L1, a positive lens L2, a negative lens L3, a positive lens L4, and a negative lens L5. The rear unit RG includes, in order from the object side to the image side, a sixth lens L6, a cemented lens L78 as a negative lens, a cemented lens L910 as a negative lens, and a positive lens L11. The cemented lens L78 is formed by joining a positive lens L7 and a negative lens L8 with each other. The cemented lens L910 is formed by joining a negative lens L9 and a positive lens L10 with each other.

FIGS. 21, 22, 23, 24, 25, 26, and 27 illustrate transmittance distributions of the optical elements according to Examples S4, S5, S6, S7, S8, S9, and S10, respectively.

Figure 21:
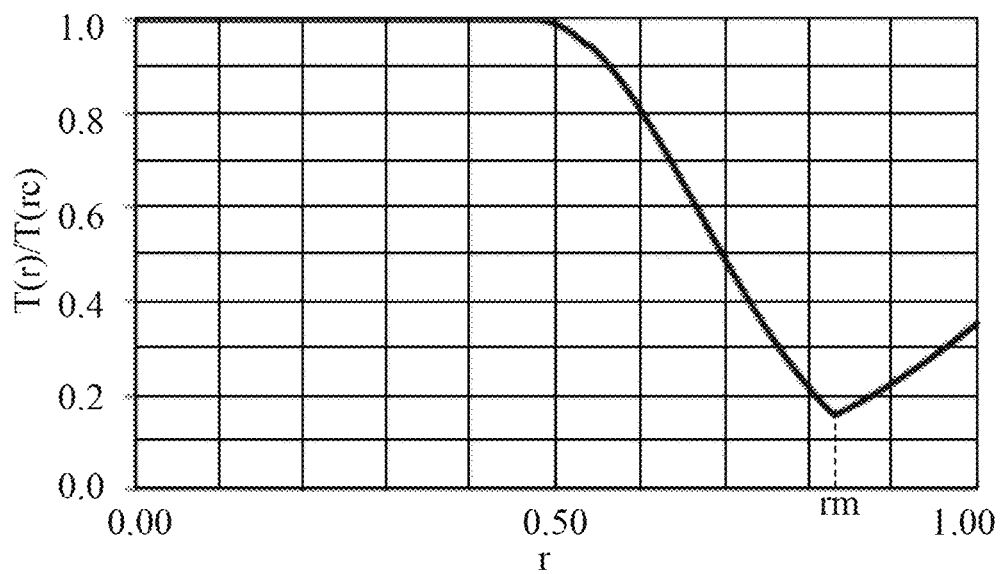
FIG. 21 illustrates a transmittance distribution of an optical element according to Example S4.

As illustrated in FIG. 21, the optical element 10 according to Example S4 has a transmittance that is as constant as 1.0 from the optical axis to r of about 0.48, decreases from r of about 0.48 to the distance rm of 0.837, is about 0.16 at rm of 0.837, and then increases as the position separates from rm of 0.837.

Figure 22:
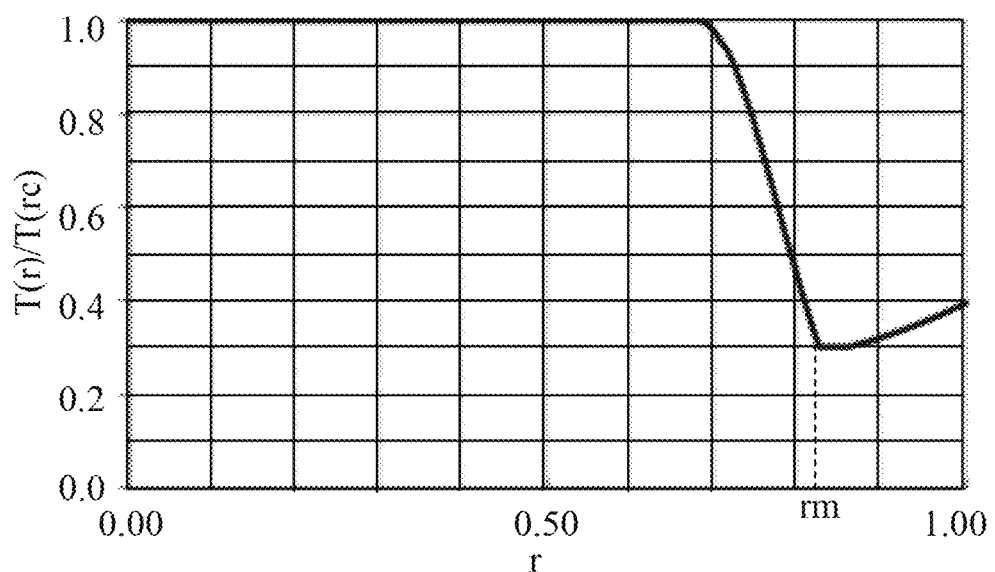
FIG. 22 illustrates a transmittance distribution of an optical element according to Example S5.

As illustrated in FIG. 22, the optical element 10 according to Example S5 has a transmittance that is as constant as 1.0 from the optical axis to r of about 0.68, decreases from r of about 0.68 to the distance rm of 0.829, is about 0.30 at rm of 0.829, and then increases as the position separates from rm of 0.829.

Figure 23:
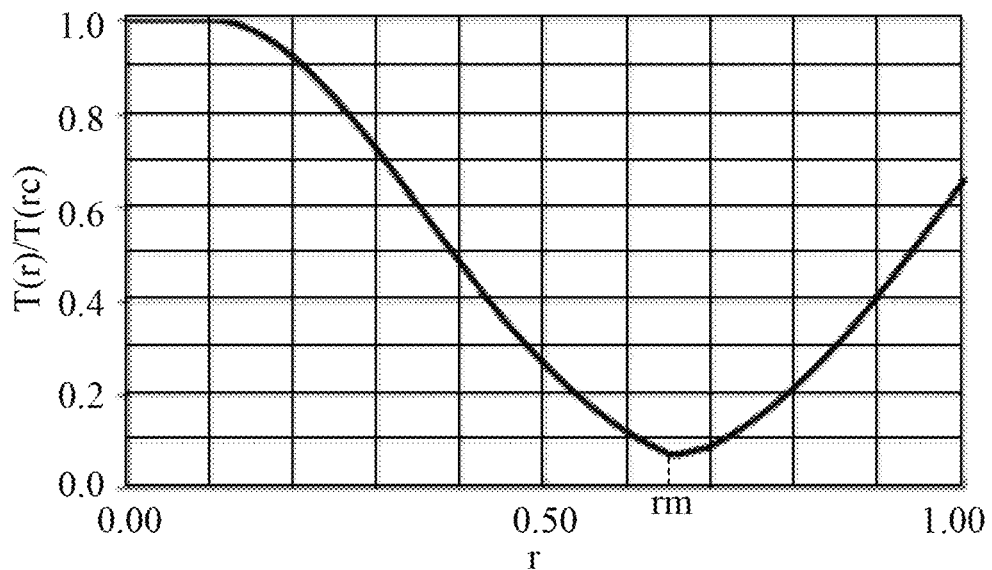
FIG. 23 illustrates a transmittance distribution of an optical element according to Example S6.

As illustrated in FIG. 23, the optical element 10 according to Example S6 has a transmittance that is as constant as 1.0 from the optical axis to r of about 0.12, decreases from r of about 0.12 to the distance rm of 0.654, is about 0.07 at rm of 0.654, and then increases as the position separates from rm of 0.654.

Figure 24:
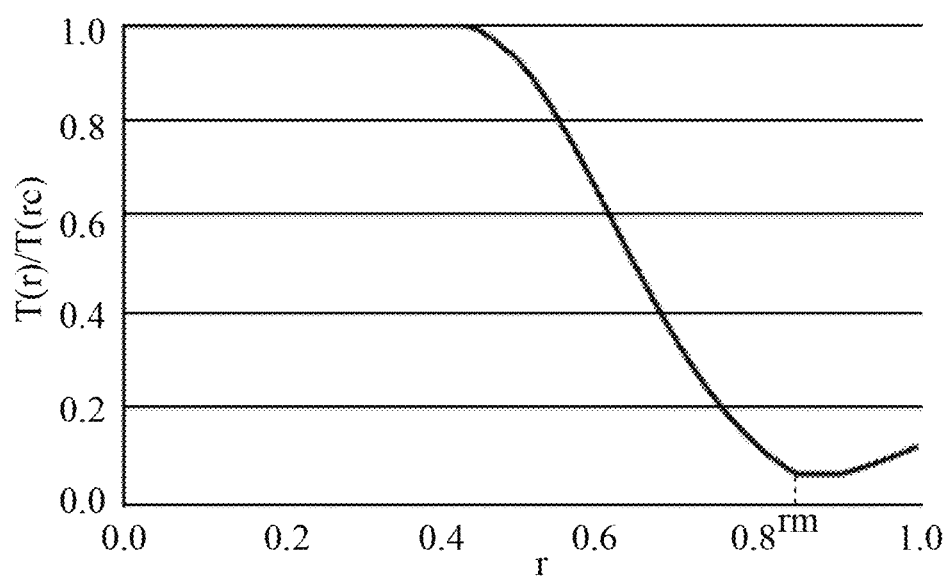
FIG. 24 illustrates a transmittance distribution of an optical element according to Example S7.

As illustrated in FIG. 24, the optical element 10 according to Example S7 has a transmittance that is as constant as 1.0 from the optical axis to r of about 0.45, decreases from r of about 0.45 to the distance rm of 0.852, is about 0.07 at rm of 0.852, and then increases as the position separates from rm of 0.852.

Figure 25:
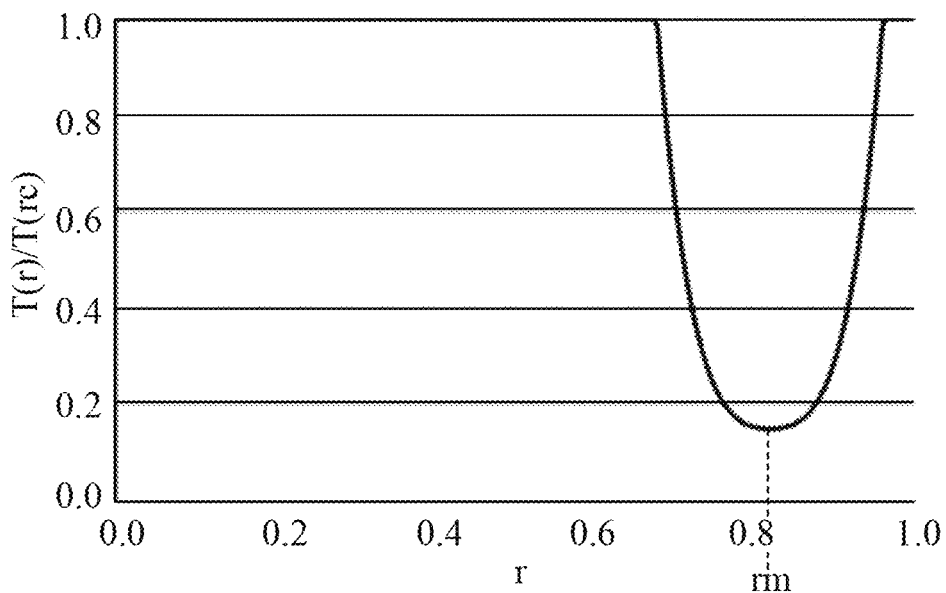
FIG. 25 illustrates a transmittance distribution of an optical element according to Example S8.

As illustrated in FIG. 25, the optical element 10 according to Example S8 has a transmittance that is as constant as 1.0 from the optical axis to r of about 0.70, decreases from r of about 0.70 to rm of 0.825, and is about 0.15 at rm of 0.825. The transmittance increases as the position separates from rm of 0.825, and becomes as constant as 1.0 when the distance is longer than r of about 0.95.

Figure 26:
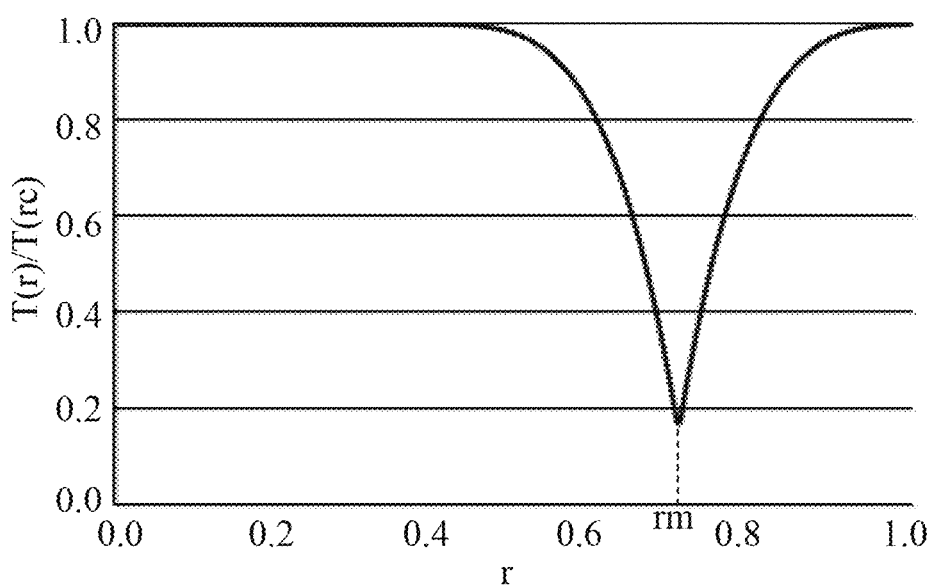
FIG. 26 illustrates a transmittance distribution of an optical element according to Example S9.

As illustrated in FIG. 26, the optical element 10 according to Example S9 has a transmittance that is as constant as 1.0 from the optical axis to r of about 0.50, decreases from r of about 0.50 to the distance rm of 0.708, is about 0.18 at rm of 0.708, and then increases as the position separates from rm of 0.708.

Figure 27:
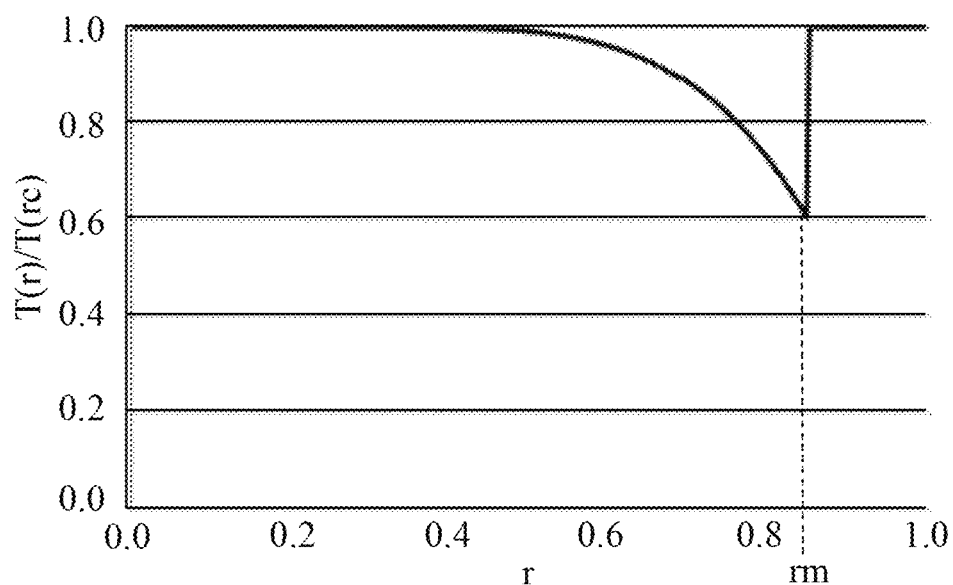
FIG. 27 illustrates a transmittance distribution of an optical element according to Example S10.

As illustrated in FIG. 27, the optical element 10 according to Example S10 has a transmittance that is as constant as 1.0 from the optical axis to r of about 0.50, decreases from r of about 0.50 to the distance rm of 0.852, and is about 0.60 at rm of 0.852. The transmittance becomes as constant as 1.0 at distance r larger than rm of 0.852.

In the aberration diagrams illustrated in FIGS. 4, 14, 16, 18, and 20, d and g represent the d-line and the g-line, $\Delta M$ and $\Delta S$ represent the meridional image surface and the sagittal image surface, respectively. Fno represents the F-number, and $\omega$ represents a half angle of view. In spherical aberration, the d-line (solid line) and the g-line (broken line) are illustrated. In the astigmatism, the meridional image plane $\Delta M$ and the sagittal image plane $\Delta S$ for the d-line are illustrated. In the distortion, the d-line is illustrated. In the chromatic aberration (lateral chromatic aberration), the aberration of the g-line for the d-line is illustrated.

In the optical system LA according to each numerical example, the surface numbers are illustrated in order from the object side, r is a radius of curvature, d is an interval, nd and vd are the refractive index and the Abbe number for the d-line, respectively. In each numerical example, two surfaces closest to the image side are planes corresponding to an optical block G. K is a conic constant, and A4, A6, A8, and A10 are fourth, sixth, eighth, and tenth order aspherical coefficients, respectively. A displacement x in the optical axis direction is expressed as follows at the position of the height h from the optical axis in the aspheric shape based on a surface vertex as a reference:

$$X=(h^2/r)/[1+\{1-(1+K)(h/r)^2\}^{1/2}]+A4 \cdot h^4+A6 \cdot h^6+A8 \cdot h^8+A10 \cdot h^{10}$$

where r is a paraxial curvature radius. For example, "e–Z" indicates "10–Z".

In each numerical embodiment, ri is a radius of curvature of an i-th surface from the object side, di is a surface distance between the i-th surface and the (i+1)-th surface from the object side, ni is refractive index of the i-th lens for the d-line, and vi denotes an Abbe number of the i-th lens for the d-line. The aspheric surface is asterisked on the right side of the surface number in each table.

Tables 1 to 3 show numerical values of respective conditional expressions for the optical system LA according to numerical examples 1 to 5 (ex 1 to ex 5) and the optical elements 10 according to Examples S1 to S10.

NUMERICAL EXAMPLE 1

| Unit mm | | | | |
|---|---|---|---|---|
| Surface data | | | | |
| Surface number | r | d | nd | vd |
| 1 | ∞ | 1.50 | | |
| 2 | 60.900 | 5.50 | 1.77250 | 49.6 |
| 3 | 1633.314 | 2.65 | | |
| 4 | ∞ | −1.60 | | |
| 5 | 25.984 | 5.13 | 1.83481 | 42.7 |
| 6 | 38.849 | 1.89 | | |
| 7 | 84.521 | 1.86 | 1.64769 | 33.8 |
| 8 | 19.062 | 9.01 | | |
| 9 (aperture stop) | ∞ | 6.63 | | |
| 10 | −20.622 | 1.94 | 1.80518 | 25.4 |
| 11 | 163.308 | 6.34 | 1.75700 | 47.8 |
| 12 | −36.595 | 0.16 | | |
| 13 | −182.257 | 4.28 | 1.88300 | 40.8 |
| 14 | −35.500 | −0.80 | | |
| 15 | ∞ | 0.95 | | |
| 16 | 109.962 | 3.00 | 1.80400 | 46.6 |
| 17 | −209.063 | 0.00 | | |
| 18 | ∞ | 0.00 | | |
| 19 | ∞ | 37.39 | | |

-continued

Unit mm

| | | | | |
|---|---|---|---|---|
| 20 | ∞ | 1.31 | 1.55900 | 60.0 |
| 21 | ∞ | 0.42 | | |
| image plane | ∞ | | | |

VARIOUS DATA
zoom ratio 1.00

| | |
|---|---|
| Focal length | 51.72 |
| F-number | 1.47 |
| angle of view | 22.70 |
| image height | 21.64 |
| lens overall length | 87.57 |
| BF | 38.65525 |
| d21 | 0.42 |

LENS UNIT DATA

| unit | starting surface | Focal length |
|---|---|---|
| 1 | 1 | 51.72 |

NUMERICAL EXAMPLE 2

Unit mm

Surface data

| Surface number | r | d | nd | vd |
|---|---|---|---|---|
| 1 | ∞ | 1.50 | | |
| 2 | 68.946 | 5.50 | 1.77250 | 49.6 |
| 3 | −1678.684 | 2.65 | | |
| 4 | ∞ | −1.60 | | |
| 5 | 27.112 | 5.13 | 1.83481 | 42.7 |
| 6 | 43.572 | 2.64 | | |
| 7 | 130.401 | 1.86 | 1.64769 | 33.8 |
| 8 | 19.820 | 9.01 | | |
| 9 (aperture stop) | ∞ | 6.63 | | |
| 10 | −22.312 | 1.94 | 1.80518 | 25.4 |
| 11 | 134.753 | 6.34 | 1.75700 | 47.8 |
| 12 | −39.837 | 0.16 | | |
| 13 | −255.971 | 4.28 | 1.88300 | 40.8 |
| 14 | −36.505 | −0.80 | | |
| 15 | ∞ | 0.95 | | |
| 16 | 83.766 | 3.00 | 1.80400 | 46.6 |
| 17 | −623.756 | 0.00 | | |
| 18 | ∞ | 0.00 | | |
| 19 | ∞ | 37.39 | | |
| 20 | ∞ | 1.31 | 1.55900 | 60.0 |
| 21 | ∞ | 0.42 | | |
| image plane | ∞ | | | |

VARIOUS DATA
zoom ratio 1.00

| | |
|---|---|
| Focal length | 51.72 |
| F-number | 1.45 |
| angle of view | 22.70 |
| image height | 21.64 |
| lens overall length | 88.32 |
| BF | 0.42 |

LENS UNIT DATA

| unit | starting surface | Focal length |
|---|---|---|
| 1 | 1 | 51.72 |

NUMERICAL EXAMPLE 3

Unit mm

Surface data

| Surface number | r | d | nd | vd |
|---|---|---|---|---|
| 1 | 61.880 | 2.99 | 1.83481 | 42.7 |
| 2 | 27.026 | 8.34 | | |
| 3 | 71.747 | 3.00 | 1.58313 | 59.4 |
| 4* | 25.706 | 6.93 | | |
| 5 | 92.706 | 4.95 | 1.88300 | 40.8 |
| 6 | −127.713 | 0.70 | | |
| 7 | −97.467 | 2.50 | 1.49700 | 81.5 |
| 8 | 39.023 | 5.83 | 1.83481 | 42.7 |
| 9 | −1070.546 | 3.79 | | |
| 10 | 46.333 | 5.98 | 1.83481 | 42.7 |
| 11 | −47.248 | 1.90 | 1.54814 | 45.8 |
| 12 | 21.482 | 5.07 | | |
| 13 | −53.687 | 1.40 | 1.65412 | 39.7 |
| 14 | 197.561 | 0.15 | | |
| 15 | 29.239 | 6.73 | 1.43387 | 95.1 |
| 16 | −44.333 | 2.59 | | |
| 17 (aperture stop) | ∞ | 7.21 | | |
| 18 | −17.904 | 3.78 | 1.60311 | 60.6 |
| 19 | −15.383 | 2.15 | 1.80518 | 25.4 |
| 20 | −48.206 | 0.25 | | |
| 21 | 97.922 | 8.54 | 1.61800 | 63.3 |
| 22 | −29.308 | 0.25 | | |
| 23* | −162.434 | 5.28 | 1.80400 | 46.6 |
| 24 | −36.488 | 38.80 | | |
| image plane | ∞ | | | |

Aspheric data

Fourth surface

K = 0.00000e+000   A4 = −5.57660e−006   A6 = −9.40593e−009
A8 = 5.84881e−012   A10 = −3.17028e−014

Twenty-third surface

K = 0.00000e+000   A4 = −1.09975e−005   A6 = −1.48146e−009
A8 = −9.36205e−012   A10 = −5.31145e−015

VARIOUS DATA
zoom ratio 1.00

| | |
|---|---|
| Focal length | 24.55 |
| F-number | 1.45 |
| angle of view | 41.39 |
| image height | 21.635 |
| lens overall length | 129.11 |
| BF | 38.80 |

LENS UNIT DATA

| Unit | Starting surface | Focal length |
|---|---|---|
| 1 | 1 | 24.55 |

NUMERICAL EXAMPLE 4

Unit mm

Surface data

| Surface number | r | d | nd | vd |
|---|---|---|---|---|
| 1 | 400.000 | 2.80 | 1.58313 | 59.4 |
| 2 | 40.544 | 6.91 | | |
| 3 | 606.181 | 2.30 | 1.58313 | 59.4 |
| 4 | 50.282 | 10.31 | | |
| 5 | 61.687 | 6.50 | 1.71300 | 53.9 |

-continued

| Unit mm | | | | |
|---|---|---|---|---|
| 6 | −188.040 | 5.20 | | |
| 7 | 47.477 | 5.06 | 1.71300 | 53.9 |
| 8 | −490.980 | 0.20 | | |
| 9 | 31.299 | 3.00 | 1.51633 | 64.1 |
| 10 | 25.382 | 9.27 | | |
| 11 | −72.820 | 3.77 | 1.83481 | 42.7 |
| 12 | −27.213 | 1.50 | 1.63980 | 34.5 |
| 13 | −1242.161 | 3.70 | | |
| 14 (aperture stop) | ∞ | 7.07 | | |
| 15 | −18.961 | 1.60 | 1.80518 | 25.4 |
| 16 | 759.560 | 3.30 | 1.83481 | 42.7 |
| 17* | −65.346 | 0.20 | | |
| 18 | −172.700 | 5.94 | 1.77250 | 49.6 |
| 19 | −30.321 | 0.20 | | |
| 20 | −160.598 | 6.81 | 1.77250 | 49.6 |
| 21 | −32.418 | 38.65 | | |
| image plane | ∞ | | | |

Aspheric data
Seventeenth surface

K = 2.39046e+000   A4 = 1.36838e−005   A6 = 3.28097e−010
A8 = −1.14450e−011

VARIOUS DATA
zoom ratio 1.00

| Focal length | 34.29 |
|---|---|
| F-number | 1.45 |
| angle of view | 32.25 |
| image height | 21.63 |
| lens overall length | 124.29 |
| BF | 38.65 |

LENS UNIT DATA

| Unit | Starting surface | Focal length |
|---|---|---|
| 1 | 1 | 34.29 |

NUMERICAL EXAMPLE 5

| Unit mm | | | | |
|---|---|---|---|---|
| Surface data | | | | |
| Surface number | r | d | nd | vd |
| 1 | 131.189 | 10.84 | 1.48749 | 70.2 |
| 2 | −264.579 | 0.90 | | |
| 3 | 53.910 | 9.80 | 1.49700 | 81.5 |
| 4 | 260.718 | 3.20 | | |
| 5 | −623.694 | 3.80 | 1.83400 | 37.2 |
| 6 | 105.942 | 2.53 | | |
| 7 | 63.907 | 8.04 | 1.49700 | 81.5 |
| 8 | −609.143 | 0.20 | | |
| 9 | 27.722 | 3.23 | 1.71736 | 29.5 |
| 10 | 23.809 | 12.30 | | |
| 11 (aperture stop) | ∞ | 3.00 | | |
| 12 | ∞ | 0.70 | 1.48749 | 70.2 |
| 13 | ∞ | 0.50 | | |
| 14 | −1002.290 | 5.00 | 1.84666 | 23.9 |
| 15 | −65.695 | 1.78 | 1.72000 | 50.2 |
| 16 | 39.690 | 21.66 | | |
| 17 | −34.937 | 2.72 | 1.74077 | 27.8 |
| 18 | 130.139 | 8.68 | 1.77250 | 49.6 |
| 19 | −43.302 | 0.50 | | |
| 20 | 97.410 | 5.67 | 1.83400 | 37.2 |
| 21 | −205.341 | 54.00 | | |
| image plane | ∞ | | | |

-continued

| Unit mm | |
|---|---|
| VARIOUS DATA | |
| zoom ratio 1.00 | |
| Focal length | 130.99 |
| F-number | 2.06 |
| angle of view | 9.38 |
| image height | 21.63 |
| lens overall length | 159.05 |
| BF | 54.00 |

LENS UNIT DATA

| Unit | Starting surface | Focal length |
|---|---|---|
| 1 | 1 | 130.99 |

TABLE 1

| | ex1 | ex2 | ex3 | ex4 | ex5 |
|---|---|---|---|---|---|
| CONDITION (1) | — | — | — | — | — |
| CONDITION (2) | — | — | — | — | — |
| CONDITION (3) | — | — | — | — | — |
| CONDITION (4) | — | — | — | — | — |
| CONDITION (5) | 0.001 | 0.00017 | 0.001 | 0.001 | 0.001 |
| CONDITION (6) | 35.754 | 35.755 | 16.928 | 23.648 | 63.587 |
| CONDITION (7) | 3.516 | 4.217 | 4.244 | 2.502 | 0.712 |
| CONDITION (8) | 0.702 | 0.692 | 0.304 | 0.211 | 0.478 |
| CONDITION (9) | 4.307 | 5.290 | 2.752 | 1.912 | 0.478 |

TABLE 2

| | s1 | s2 | s3 | s4 | s5 |
|---|---|---|---|---|---|
| CONDITION (1) | 0.712 | 0.805 | 0.907 | 0.837 | 0.829 |
| CONDITION (2) | 0.893 | 0.661 | 0.699 | 0.811 | 0.932 |
| CONDITION (3) | 1.211 | 1.150 | 1.061 | 1.109 | 1.137 |
| CONDITION (4) | 0.151 | 0.217 | 0.443 | 0.461 | 0.770 |
| CONDITION (5) | — | — | — | — | — |
| CONDITION (6) | — | — | — | — | — |
| CONDITION (7) | — | — | — | — | — |
| CONDITION (8) | — | — | — | — | — |
| CONDITION (9) | — | — | — | — | — |

TABLE 3

| | s6 | s7 | s8 | s9 | s10 |
|---|---|---|---|---|---|
| CONDITION (1) | 0.654 | 0.852 | 0.825 | 0.708 | 0.852 |
| CONDITION (2) | 0.582 | 0.749 | 0.861 | 0.925 | 0.899 |
| CONDITION (3) | 1.344 | 1.125 | 1.139 | 1.080 | — |
| CONDITION (4) | 0.116 | 0.546 | 0.150 | 0.176 | 0.609 |
| CONDITION (5) | — | — | — | — | — |
| CONDITION (6) | — | — | — | — | — |
| CONDITION (7) | — | — | — | — | — |
| CONDITION (8) | — | — | — | — | — |
| CONDITION (9) | — | — | — | — | — |

Figure 28:
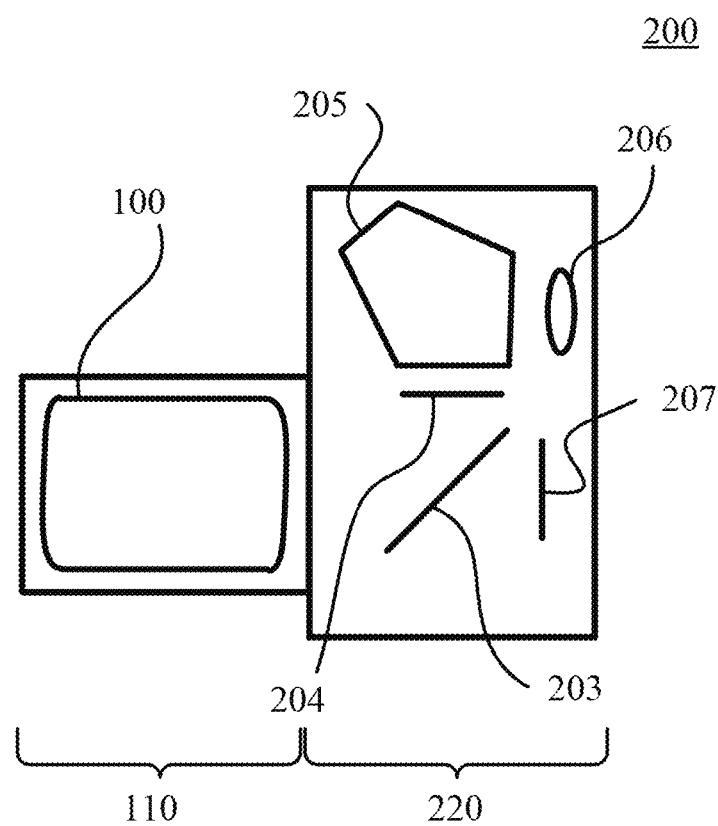
FIG. 28 is a configuration diagram of an imaging apparatus according to this embodiment.

Referring now to FIG. 28, a description will be given of an imaging apparatus 200 including the optical system (imaging optical system) 100 according to this embodiment. A lens barrel 110 has the optical system 100. The optical system 100 corresponds to any one of the optical systems LA according to Examples 1 to 5. The optical system 100 is held by a lens barrel 110 as a holding member.

A camera body 220 includes a quick return mirror 203, a focus plate 204, a penta dach pre-zoom 205, and an eyepiece 206. The quick return mirror 203 upwardly reflects the light flux formed through the optical system 100. The focus plate 204 is disposed at the imaging position of the optical system 100. The penta dach pre-zoom 205 converts an inverted image formed on the focus plate 204 into an erect image. The user can observe the erect image through the eyepiece 206. A photoelectric conversion element (image sensor), such as a CCD sensor or a CMOS sensor, or a silver halide film configured to receive an image is disposed on a photosensitive surface 207. In the imaging, the quick return mirror 203 is retreated from the optical path, and an image (optical image) is formed on the photosensitive surface 207 by the optical system 100. Thus, the image sensor photoelectrically converts the optical image formed by the optical system 100 and outputs image data.

Applying the lens barrel 110 according to this embodiment to the imaging apparatus 200 such as a single-lens reflex camera can realize an optical apparatus having a high optical performance. The lens barrel 110 is an interchangeable lens that is detachably attached to the camera body 220, but this embodiment is also applicable to an imaging apparatus in which the lens barrel 110 and the camera main body 220 are integrally with each other. The lens barrel 110 is also applicable to a mirrorless (nonreflex) single-lens camera (mirrorless camera) having no quick return mirror.

This embodiment can provide an optical system and an imaging apparatus capable of successfully acquiring a defocus image while suppressing a decrease in a light amount of the focus image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the optical system according to this embodiment is an optical system suitable for use in an imaging apparatus, such as a digital still camera, a video camera, a surveillance camera, a broadcast camera, an interchangeable lens, and a film-based camera, but is applicable to another optical apparatus, such as a microscope and a projection type display apparatus.

This application claims the benefit of Japanese Patent Application No. 2018-005382, filed on Jan. 17, 2018, which is hereby incorporated by reference herein in its entirety.

What is claimed is:

1. An imaging optical system comprising:
an optical element having a transmittance that changes in a radial direction perpendicular to an optical axis; and
a plurality of lenses including at least one lens disposed on an object side of the optical element and at least one lens disposed on an image side of the optical element such that the optical element is disposed between the at least one lens on the object side of the optical element and the at least one lens on the image side of the optical element,
wherein the transmittance of the optical element disposed between the at least one lens on the object side of the optical element and the at least one lens on the image side of the optical element is minimized at a first position of the optical element in the radial direction separated from an optical axis position of the optical element by a distance smaller than an effective radius rd of the optical element,
wherein the transmittance of the optical element disposed between the at least one lens on the object side of the optical element and the at least one lens on the image side of the optical element at the first position is smaller than (i) a transmittance at the optical axis position and (ii) a transmittance at a second position separated from the optical axis position in the radial direction by the effective radius rd, and
wherein the following conditional expression is satisfied:

$$0.10 < ra/rm < 0.98$$

where $T(rc)$ is the transmittance at the optical axis position, $T(rm)$ is the transmittance at the first position, ra is a distance from the optical axis to a position where the transmittance of the optical element is $\{T(rc)-T(rm)\}/2$, and rm is a distance from the optical axis position to the first position.

2. The imaging optical system according to claim 1, wherein the following conditional expression is satisfied:

$$0.10 < rm/rd < 0.95.$$

3. The imaging optical system according to claim 1, wherein the following conditional expression is satisfied:

$$0.01 < T(rm)/T(rd) < 0.95$$

where $T(rd)$ is the transmittance at the second position.

4. The imaging optical system according to claim 1, wherein the following conditional expression is satisfied:

$$|SAmax|/f < 0.01$$

where SAmax is a maximum value of a spherical aberration in a marginal ray for a d-line, and f is a focal length of the imaging optical system.

5. The imaging optical system according to claim 1, further comprising an aperture stop,
wherein the following conditional expression is satisfied:

$$2.0 < f/Fno < 500.0$$

where f is a focal length of the imaging optical system, and Fno is an open F-number.

6. The imaging optical system according to claim 5, wherein the following conditional expression is satisfied:

$$0.15 < fa/f < 10.0$$

where fa is a focal length of the imaging optical system on the object side of the aperture stop.

7. The imaging optical system according to claim 5, wherein the following conditional expression is satisfied:

$$0.01 < La/Ld < 0.95$$

where La is a length on the optical axis from the aperture stop to an image plane, and Ld is a length on the optical axis from a lens surface closest to an object in the imaging optical system to the image plane.

8. The imaging optical system according to claim 5, wherein the following conditional expression is satisfied:

$$0.1 < fa/fb < 10.0$$

where fa is a focal length of the optical system on the object side of the aperture stop, and fb is a focal length of the optical system on the image side of the aperture stop.

9. The imaging optical system according to claim 1, wherein the optical element includes a linear region formed so as to surround the optical axis position and serving as a light shield portion configured to change the transmittance.

10. The imaging optical system according to claim 9, wherein the light shield portion is formed has an annular shape.

11. The imaging optical system according to claim 1, wherein the optical element includes a plurality of light shield portions arranged so as to surround the optical axis position and serving as a light shield portion configured to change the transmittance.

12. The imaging optical system according to claim 1, wherein the optical element is a pupil filter configured to correct an aberration of the imaging optical system.

13. The imaging optical system according to claim 12, wherein the aberration is a spherical aberration of the imaging optical system.

14. The imaging optical system according to claim 1, wherein the optical element is a filter configured to correct a point spread function of a defocus image.

15. The imaging optical system according to claim 1, wherein the optical element is disposed at an entrance pupil in the imaging optical system.

16. The imaging optical system according to claim 1, wherein the transmittance from a third position separated from the optical axis position in the radial direction by a distance smaller than rd to the first position is equal to the transmittance at the first position.

17. An imaging optical system comprising:
an optical element having a transmittance that changes in a radial direction perpendicular to an optical axis; and
a plurality of lenses including at least one lens disposed on an object side of the optical element and at least one lens disposed on an image side of the optical element such that the optical element is disposed between the at least one lens on the object side of the optical element and the at least one lens on the image side of the optical element,
wherein the transmittance of the optical element disposed between the at least one lens on the object side of the optical element and the at least one lens on the image side of the optical element is minimized at a first position of the optical element in the radial direction separated from an optical axis position of the optical element by a distance smaller than an effective radius rd of the optical element,
wherein the transmittance of the optical element disposed between the at least one lens on the object side of the optical element and the at least one lens on the image side of the optical element at the first position is smaller than (i) a transmittance at the optical axis position and (ii) a transmittance at a second position separated from the optical axis position in the radial direction by the effective radius rd, and
wherein the following conditional expression is satisfied:

$$1.04 < rb/rm < 4.5$$

where $T(rd)$ is the transmittance at the second position, $T(rm)$ is the transmittance at the first position, rb is a distance from the optical axis to a position where the transmittance of the optical element is $\{T(rd)-T(rm)\}/2$, and rm is the distance from the optical axis position to the first position.

18. An imaging apparatus comprising:
an imaging optical system; and
an image sensor configured to photoelectrically convert an optical image formed via the imaging optical system,
wherein the imaging optical system includes:
an optical element having a transmittance that changes in a radial direction perpendicular to an optical axis; and
a plurality of lenses including at least one lens disposed on an object side of the optical element and at least one lens disposed on an image side of the optical element such that the optical element is disposed between the at least one lens on the object side of the optical element and the at least one lens on the image side of the optical element,
wherein the transmittance of the optical element disposed between the at least one lens on the object side of the optical element and the at least one lens on the image side of the optical element is minimized at a first position of the optical element in the radial direction separated from an optical axis position of the optical element by a distance smaller than an effective radius rd of the optical element,
wherein the transmittance of the optical element disposed between the at least one lens on the object side of the optical element and the at least one lens on the image side of the optical element at the first position is smaller than (i) a transmittance at the optical axis position and (ii) a transmittance at a second position separated from the optical axis position in the radial direction by the effective radius rd, and
wherein the following conditional expression is satisfied:

$$0.10 < ra/rm < 0.98$$

where $T(rc)$ is the transmittance at the optical axis position, $T(rm)$ is the transmittance at the first position, ra is a distance from the optical axis to a position where the transmittance of the optical element is $\{T(rc)-T(rm)\}/2$, and rm is a distance from the optical axis position to the first position.

\* \* \* \* \*